(12) United States Patent
Hamner et al.

(10) Patent No.: US 12,352,704 B2
(45) Date of Patent: Jul. 8, 2025

(54) METROLOGY SYSTEM FOR MEASURING EDGE OF CIRCULAR WORKPIECE

(71) Applicant: Mitutoyo Corporation, Kanagawa-ken (JP)

(72) Inventors: Christopher Richard Hamner, Kirkland, WA (US); Vahan Senekerimyan, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 309 days.

(21) Appl. No.: 18/147,617

(22) Filed: Dec. 28, 2022

(65) Prior Publication Data

US 2024/0219316 A1    Jul. 4, 2024

(51) Int. Cl.
*G01N 21/95*        (2006.01)
*G01N 21/88*        (2006.01)

(52) U.S. Cl.
CPC ..... *G01N 21/9503* (2013.01); *G01N 21/8806* (2013.01); *G01N 2021/8835* (2013.01)

(58) Field of Classification Search
CPC .......... G01N 21/9503; G01N 21/8806; G01N 2021/8835; G01B 11/24; G01B 11/028; G01B 11/2433; H01L 22/12; H01L 22/20
See application file for complete search history.

(56) References Cited

U.S. PATENT DOCUMENTS

| | | | |
|---|---|---|---|
| 4,576,482 A * | 3/1986 | Pryor | G01B 11/2433 356/612 |
| 5,555,091 A | 9/1996 | Kagamida | |
| 7,456,978 B2 | 11/2008 | Akamatsu | |
| 7,977,123 B2 | 7/2011 | Fischer et al. | |
| 8,310,536 B2 | 11/2012 | Akamatsu et al. | |
| 9,734,568 B2 | 8/2017 | Vajaria et al. | |
| 9,927,617 B2 | 3/2018 | Morimoto | |
| 2003/0169916 A1 * | 9/2003 | Hayashi | G01N 21/9503 382/145 |
| 2004/0012775 A1 * | 1/2004 | Kinney | G01N 21/9501 356/237.2 |

(Continued)

FOREIGN PATENT DOCUMENTS

JP          2001004341 A       1/2001

*Primary Examiner* — Sang H Nguyen
(74) *Attorney, Agent, or Firm* — Seed IP Law Group LLP

(57) ABSTRACT

A metrology system includes an illumination configuration having an illumination source, an objective lens configuration, and an image sensor configuration including an image sensor. The objective lens configuration includes an objective lens and has a lens optical axis. The illumination configuration, the objective lens configuration and the image sensor configuration form an optical path along which illumination from the illumination configuration travels. The illumination configuration provides illumination in an illumination direction toward at least a portion of an edge of a circular workpiece that is along the optical path. At least part of the illumination configuration is tilted relative to the objective lens configuration such that the illumination direction is at a first tilt angle in relation to the lens optical axis. The objective lens configuration directs illumination toward the image sensor configuration which is configured to provide an image corresponding to the edge of the circular workpiece.

20 Claims, 15 Drawing Sheets

(56) References Cited

U.S. PATENT DOCUMENTS

| | | | | |
|---|---|---|---|---|
| 2004/0239920 A1* | 12/2004 | Kreh | .................. | G01N 21/8806 |
| | | | | 356/237.3 |
| 2006/0109484 A1* | 5/2006 | Akamatsu | ............ | G01B 11/028 |
| | | | | 356/613 |
| 2009/0161094 A1* | 6/2009 | Watkins | ................ | G06T 7/0004 |
| | | | | 348/126 |
| 2010/0026997 A1* | 2/2010 | Hayashi | .................. | H01L 22/12 |
| | | | | 382/145 |
| 2010/0297788 A1* | 11/2010 | Fischer | ................... | H01L 22/12 |
| | | | | 156/345.24 |
| 2010/0302551 A1* | 12/2010 | Akamatsu | .............. | G01B 11/24 |
| | | | | 356/610 |
| 2015/0330914 A1* | 11/2015 | Maleev | .................. | G01N 21/47 |
| | | | | 356/237.5 |
| 2021/0291404 A1* | 9/2021 | Komatsu | ................ | B28D 5/029 |

\* cited by examiner

METROLOGY SYSTEM FOR MEASURING EDGE OF CIRCULAR WORKPIECE

BACKGROUND

Technical Field

The disclosure relates generally to precision metrology, and more particularly to precision measurement of an edge of a circular workpiece (e.g., a semiconductor wafer).

Description of the Related Art

Quality control of objects (e.g., workpieces) that include specific surface profiles (e.g., produced by various manufacturing processes), is becoming increasingly demanding in terms or throughput, measurement resolution, and accuracy. An example of such a workpiece is a semiconductor wafer. Ideally, such workpieces should be measured/inspected to ensure proper dimensions, function, etc. However, highly precise (e.g., micron level measurement tolerances) may be required in order to confirm a workpiece with desired characteristics for some applications.

Various precision metrology systems may be used for workpiece surface measurements and inspection. One prior system specifically directed to measuring an edge of a semiconductor wafer is disclosed in U.S. Pat. No. 8,310,536, which is hereby incorporated herein by reference in its entirety. As described in the '536 patent, at a time of manufacturing, an edge of a semiconductor wafer may in some instances be damaged (e.g., scratched or chipped). In some instances, a probability of a scratch or chip in the edge may be considered to have a relationship with certain characteristics (e.g., certain dimensions and/or a shape, etc.) of the edge, for which it may be desirable to accurately measure the edge (e.g., for which a cross-sectional shape of the edge in the thickness direction may be determined as part of the measuring process). It is noted that in some instances an edge may have contaminants (e.g., dust, etc.) disposed thereon, for which the '536 patent discloses a system directed to accurate measurements even when contaminants are present.

Configurations that may improve or otherwise enhance such metrology systems (e.g., for measuring and inspecting an edge of a circular workpiece such as a semiconductor wafer) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system comprises an illumination configuration, an objective lens configuration, and an image sensor configuration. The illumination configuration includes an illumination source. The objective lens configuration includes an objective lens and has a lens optical axis. The image sensor configuration includes an image sensor. The illumination configuration, the objective lens configuration and the image sensor configuration form an optical path along which illumination from the illumination configuration travels. The illumination configuration is configured to provide illumination in an illumination direction toward at least a portion of an edge of a circular workpiece that is along the optical path. At least part of the illumination configuration is tilted relative to the objective lens configuration such that the illumination direction is at a first tilt angle in relation to the lens optical axis of the objective lens configuration. The objective lens configuration directs illumination toward the image sensor configuration which is configured to provide an image corresponding to the edge of the circular workpiece.

According to one aspect, a method for operating the metrology system is provided. In accordance with the method, the illumination configuration is operated to provide illumination in an illumination direction toward at least a portion of an edge of a circular workpiece that is along an optical path, wherein at least part of the illumination configuration is tilted relative to the objective lens configuration such that the illumination direction is at a first tilt angle in relation to the lens optical axis of the objective lens configuration and the objective lens configuration directs illumination toward the image sensor configuration. The image sensor configuration is operated to provide an image corresponding to the edge of the circular workpiece.

According to another aspect, the illumination configuration is provided for use in a metrology system. The illumination configuration is configured to provide illumination in an illumination direction toward at least a portion of an edge of a circular workpiece that is along the optical path. At least part of the illumination configuration is tilted relative to the objective lens configuration such that the illumination direction is at a first tilt angle in relation to the lens optical axis of the objective lens configuration. The objective lens configuration directs illumination toward the image sensor configuration which is configured to provide an image corresponding to the edge of the circular workpiece.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
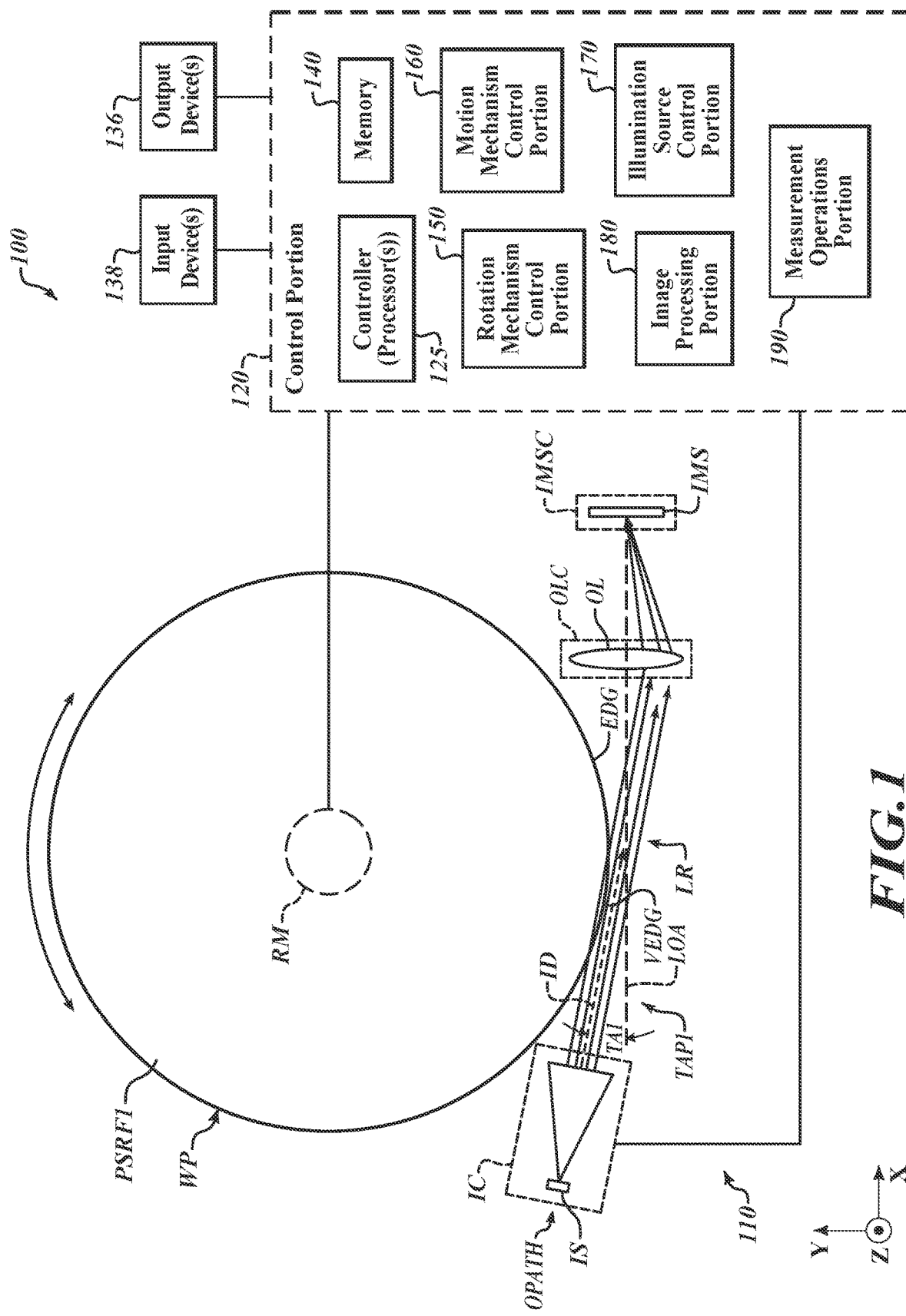
FIG. 1 is a diagram of a top view of a metrology system including an imaging portion and a control portion.
Figure 2:
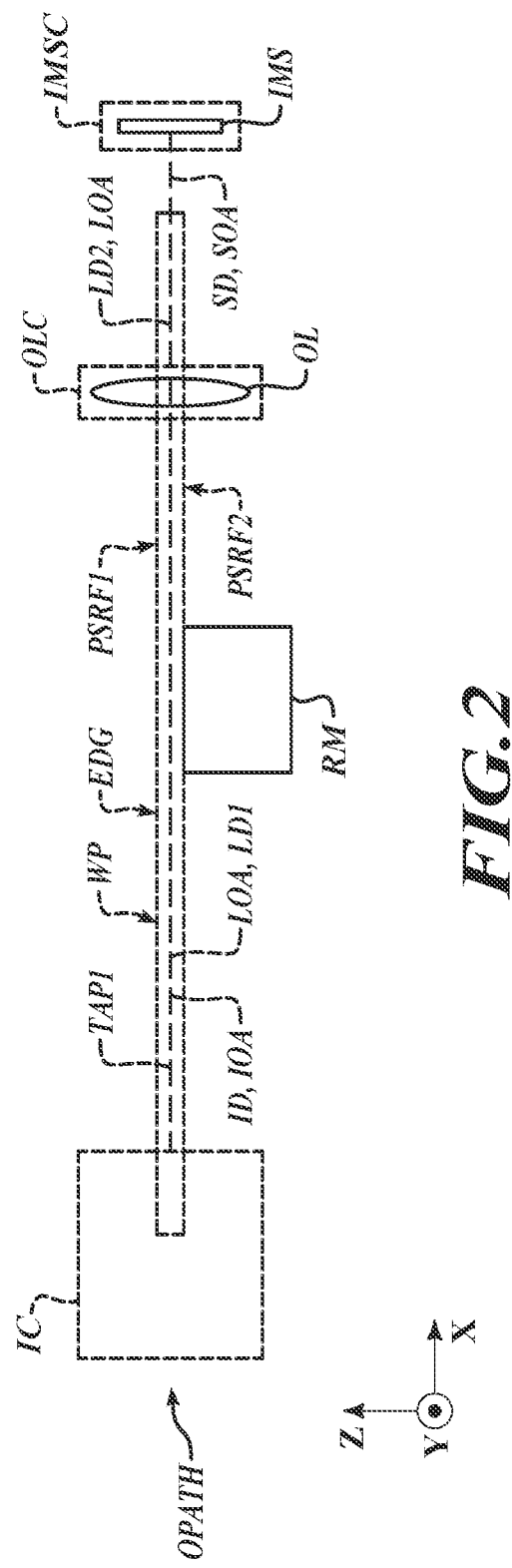
FIG. 2 is a diagram of a side view of the imaging portion of FIG. 1.

FIG. 1 is a diagram of a top view of a metrology system 100 (e.g., for measuring an edge EDG circular workpiece WP, such as a semiconductor wafer). The metrology system 100 includes an imaging portion 110 and a control portion 120, including certain features as disclosed herein. As will be described in more detail below, the control portion 120 is utilized to control the imaging portion 110. FIG. 2 is a side view (i.e., also referenced as a front view) of the imaging portion 110.

As illustrated in FIGS. 1 and 2, the imaging portion 110 includes an illumination configuration IC, an objective lens configuration OLC and an image sensor configuration IMSC. The illumination configuration IC includes an illumination source IS and is configured to direct light in an illumination direction ID (e.g., that is coaxial or parallel with an illumination optical axis IOA). In various implementations, the illumination configuration IC (e.g., which includes a portion generally represented by a triangular shape for simplicity in FIG. 1) may also include certain other components (e.g., a collimating lens, an aperture, etc., some examples of which will be described in more detail below with respect to FIGS. 9, 11 and 12, and for which the illumination optical axis IOA may correspond to the optical axis of certain components, such as the illumination source IS and/or an illumination collimating lens, etc.).

The objective lens configuration OLC includes an objective lens OL and has a lens optical axis LOA (e.g., which may correspond to the optical axis of the objective lens OL). In various implementations, the objective lens configuration OLC may also include certain other components (e.g., an aperture and/or one or more additional lenses and/or for which the objective lens OL may include or be representative of a plurality of lenses and/or an aperture, etc., such as for forming a telecentric arrangement, an example of which will be described in more detail below with respect to FIG. 8). A first lens direction LD1 is from the objective lens configuration OLC toward the illumination configuration IC and is coaxial or parallel with the lens optical axis LOA. A second lens direction LD2 is from the objective lens configuration OLC toward the image sensor configuration IMSC and is coaxial or parallel with the lens optical axis LOA. The image sensor configuration IMSC includes an image sensor IMS (e.g., a CCD image sensor, etc.). In various implementations, the image sensor configuration IMSC may also include certain other components. The image sensor configuration IMSC is oriented in a sensor direction SD which is coaxial or parallel with a sensor optical axis SOA (e.g., which may intersect with a center of a sensor array and be perpendicular to a plane of the sensor array of the image sensor IMS).

In various implementations, the illumination configuration IC, the objective lens configuration OLC and the image sensor configuration IMSC form an optical path OPATH along which illumination (e.g., including light rays LR) from the illumination configuration IC travels. The illumination configuration IC is configured to provide illumination in the illumination direction ID (e.g., corresponding to a direction of light rays LR) toward at least a portion of an edge EDG of a circular workpiece WP (e.g., illustrated as a semiconductor wafer in the present example) that is along the optical path. At least part of the illumination configuration IC is tilted relative to the objective lens configuration OLC such that the illumination direction ID is at a first tilt angle TA1 in relation to the lens optical axis LOA of the objective lens configuration OLC. The objective lens configuration OLC directs illumination toward the image sensor configuration IMSC which is configured to provide an image corresponding to the edge EDG of the circular workpiece WP.

In various implementations, the circular workpiece (e.g., a disk-shaped semiconductor wafer) includes a first planar surface PSRF1 and a second planar surface PSRF2 (e.g., which in various implementations may be referenced as top and bottom surfaces, or front and back surfaces), for which the edge EDG (e.g., a chamfered edge) is the portion of the workpiece that is generally (e.g., approximately) located between the outer edges of the first and second planar surfaces. In various implementations, a first tilt direction TD1 (e.g., as described in more detail below with respect to FIG. 4) corresponds to the first tilt angle TA1 and is parallel to the first and second planar surfaces. In various implementations, the first tilt direction TD1 and the first tilt angle TA1 may be referenced as laying or otherwise being within a first tilt angle plane TAP1 (e.g., that is parallel to the first and second planar surfaces PSRF1 and PSRF2).

Figure 3A:
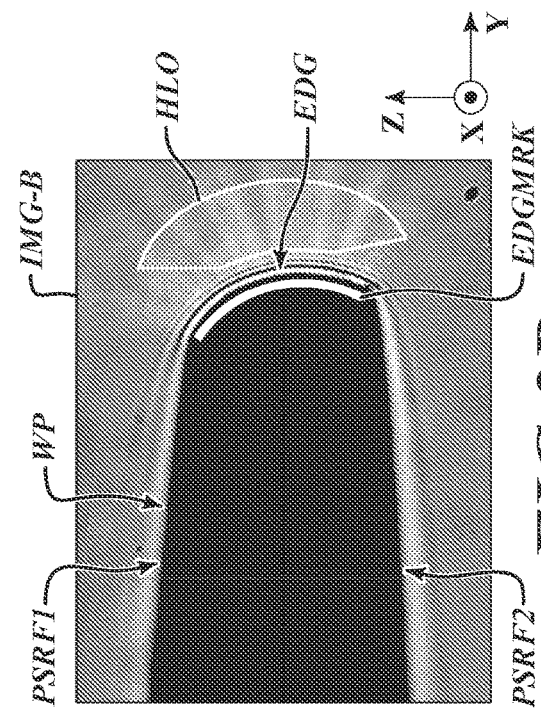
FIGS. 3A-3C are diagrams including images corresponding to an edge of a circular workpiece.
Figure 3B:
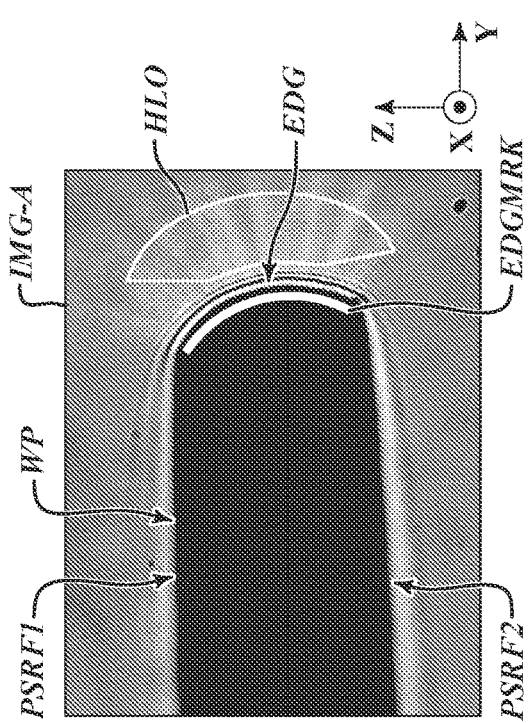
Figure 3C:
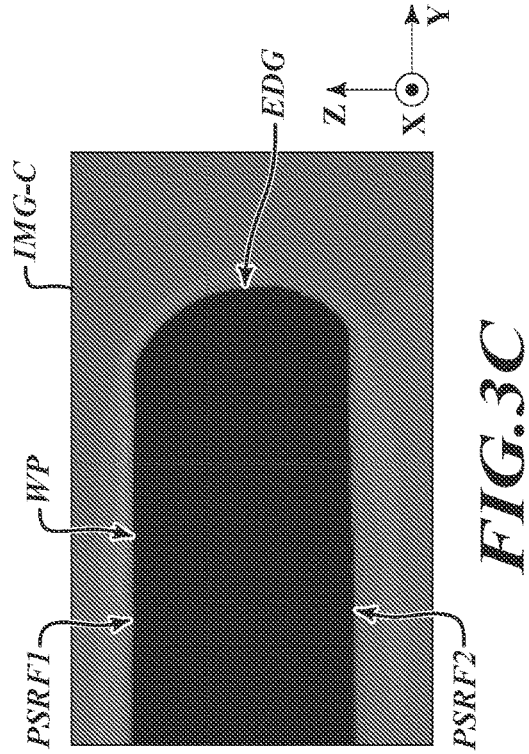

As indicated above, during operation of the metrology system 100, light rays LR originating from the illumination configuration IC pass through the objective lens configuration OLC and are gathered by the image sensor configuration IMSC. An image (e.g., a shadow image) corresponding to the edge EDG of the workpiece WP is captured by the image sensor configuration IMSC, and is output to the control portion 120 (e.g., to be processed by the image processing portion 180 and/or utilized for certain inspection/ measurement operations by the measurement operations portion 190, etc.) Certain example images are illustrated in FIGS. 3A-3C, as will be described in more detail below.

As shown in FIG. 1, in various exemplary implementations, the control portion 120 includes a controller 125 (e.g., comprising or operating as part of one or more processors), a memory 140, a rotation mechanism control portion 150, a motion mechanism control portion 160, an illumination source control portion 170, an image processing portion 180, and a measurement operations portion 190. Each of these components, as well as the additional components described below, may be virtual components (e.g., as part of a memory, such as memory 140), and/or may be interconnected by one or more data/control busses and/or application programming interfaces, or by direct connections between the various elements. In various implementations, one or more processors (e.g., of the controller 125) are coupled to the memory 140. In various implementations, the memory 140 may store program instructions that when executed by the one or more processors cause the one or more processors to perform various functions (e.g., including performing certain methods, routines and/or operations, etc. as described herein).

Those skilled in the art will appreciate that the control portion 120 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory (e.g., memory 140), such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The metrology system 100 may also include one or more output devices 136 (e.g., a display, etc.) and one or more input devices 138 (e.g., a keyboard, mouse, etc.), which may be connected to the control portion 120. In various implementations, the output devices 136 and input devices 138 may be used to display a user interface that may include various graphical user interface (GUI) features that are usable to perform inspection/measurement operations, to view the images captured by the image sensor configuration IMSC, and/or to control the imaging portion 110. In various implementations, one or more input devices and/or an output devices may include and/or be connected to an external computer, etc.

The rotation mechanism control portion 150 may be utilized to control a rotation mechanism RM. In various implementations, the rotation mechanism RM is utilized to rotate the circular workpiece WP (e.g., for enabling acquisition of images corresponding to different portions/locations along the edge EDG, as will be understood by one skilled in the art, such as in relation to the operations as described herein and in the previously incorporated '536 patent). In certain alterative implementations, a rotation mechanism may be utilized for rotating the imaging portion 110 around the circular workpiece WP and/or for otherwise achieving relative motion between the circular workpiece WP and the imaging portion 110. The motion mechanism control portion 160 may be utilized to control a motion mechanism MM (e.g., as will be described in more detail below with respect to FIGS. 11 and 12 in relation to adjusting the illumination direction ID to be nominally parallel to the first and second planar surfaces PSRF1 and PSRF2 of the workpiece, such as may correspond to minimizing a second tilt angle TA2).

The illumination source control portion 170 may be utilized for controlling the illumination source IS (e.g., for turning the illumination source IS off and on and/or otherwise controlling a timing or other aspect of the illumination source IS). The image processing portion 180 may be utilized for processing images from the image sensor configuration IMSC (e.g., for which certain example images are illustrated in FIGS. 3A-3C as will be described in more detail below.). The measurement operations portion 190 may be utilized for performing measurement operations (e.g., some examples of which will be described in more detail below with respect to FIGS. 13 and 14).

As mentioned above, FIGS. 3A-3C are diagrams including example captured shadow images IMC-A to IMC-C corresponding to an edge of a circular workpiece WP, such as an edge of a semiconductor wafer. As illustrated in FIGS. 3A and 3B, out-of-focus shallow reflections of the edge of the workpiece WP may be captured by an image sensor configuration (e.g., image sensor configuration IMSC of FIG. 1), and create edge ringing in the captured shadow images, such as halo and ringing distortion effects in the captured shadow images IMG-A and IMG-B of FIGS. 3A and 3B.

The halo distortion effect introduces bright halo regions in the captured images IMG-A and IMG-B, which are indicated by halo regions HLO in FIGS. 3A and 3B. The ringing distortion effect introduces multiple shadow edges EDG that extend beyond the actual edge of the workpiece. The actual edge of the workpiece WP is indicated by an edge mark EGDMARK in FIGS. 3A and 3B. Misalignment of an illumination source with respect to the planar surfaces of a workpiece, such as, with reference to FIGS. 1 and 2, a misalignment of illumination source IS with respect to first and second planar surfaces PSRF1 and PSRF2 of the workpiece WP, may also introduce distortion in the captured shadow images of the workpiece WP. For example, when the illumination source IS is not parallel to the planar surfaces PSRF1 and PSRF2 of the workpiece WP, the generally parallel planar surfaces PSRF1 and PSRF2 of the workpiece WP may appear distorted such as illustrated in image IMG-B of FIG. 3B.

The halo, ringing and misalignment distortion effects may obscure the actual edge of the workpiece WP in the captured shadow images IMG-A and IMG-B. While the multiple reflection shadow edges EDG of images IMG-A and IMG-B of FIGS. 3A and 3B may provide some information about the actual edge profile of a workpiece WP, the relative position of the imaged shadow edges varies depending on the alignment of the illumination source IS and the workpiece WP, and the focus.

FIG. 3C illustrates a preferred image IMG-C resulting from a configuration utilizing principles as disclosed herein (e.g., in which the ringing effect and misalignment effects have been suppressed, etc.). As some examples, some specific configurations utilizing principles as disclosed herein are illustrated in FIGS. 1, 2, 6A, 6B, 7A, 7B, etc.). In the captured shadow image IMG-C of FIG. 3C, there are no noticeable halo and ringing distortion effects, the captured shadow image EDG of the edge of the workpiece WP generally aligns with the actual edge of the workpiece WP, and the generally parallel planar surfaces PSRF1 and PSRF2 appear to be generally parallel to each other.

As discussed in more detail below, in accordance with principles as disclosed herein, a configuration may use tilted illumination, or a combination of tilted illumination and tilted imaging, to reduce edge ringing distortion, etc. A first direction of tilt (see tilt direction TD1 in FIGS. 4, 6B and 7B) is parallel to the top and bottom planar surfaces of the workpiece (see top and bottom planar surfaces PSRF1 and PSRF2 of the workpiece WP of FIGS. 1 and 2). In various implementations, tilting the illumination configuration along the first tilt direction TD1 reduces image distortion, and greatly simplifies and improves the edge detection and measurement process.

The tilted illumination configuration does not require special components, so the tilted illumination configuration can be adapted for use with any objective lens configuration OLC. The tilt angle TA1 between the illumination configuration IC and an objective lens configuration OLC may be determined at least in part by the numerical aperture (NA) (e.g., corresponding to a maximum acceptance angle) of the objective lens configuration. The tilt angle TA1 may be set to slightly less than the numerical aperture (NA) in certain implementations.

Figure 4:
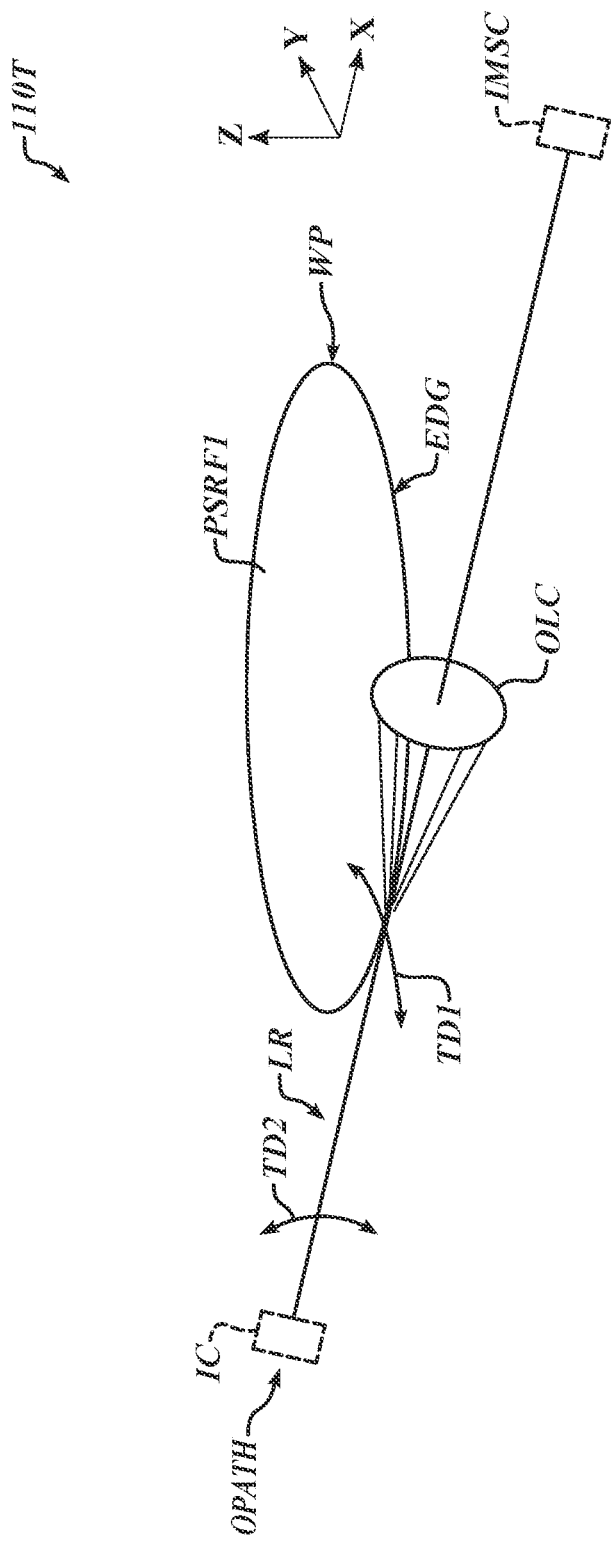
FIG. 4 is a diagram of an imaging portion illustrating different tilt directions.

FIG. 4 is a diagram of an imaging portion 110T illustrating a first tilt direction TD1 and a second tilt direction TD2. The first tilt direction TD1 is parallel to the top and bottom planar surfaces PSRF1 and PSRF2 of the workpiece WP in the X-Y plane, and indicates the direction along which light rays LR may be adjusted or tilted to be at the first tilt angle TA1, as illustrated in FIG. 1 (top view), and FIGS. 6B and 7B (top views). The first tilt angle TA1 is an angle of the illumination direction ID relative to the lens optical axis LOA. Tilting along the first tilt direction TD1 may be employed in some implementations to reduce edge distortion, as discussed in more detail below with reference to FIGS. 6A, 6B, 7A and 7B.

Figure 11:
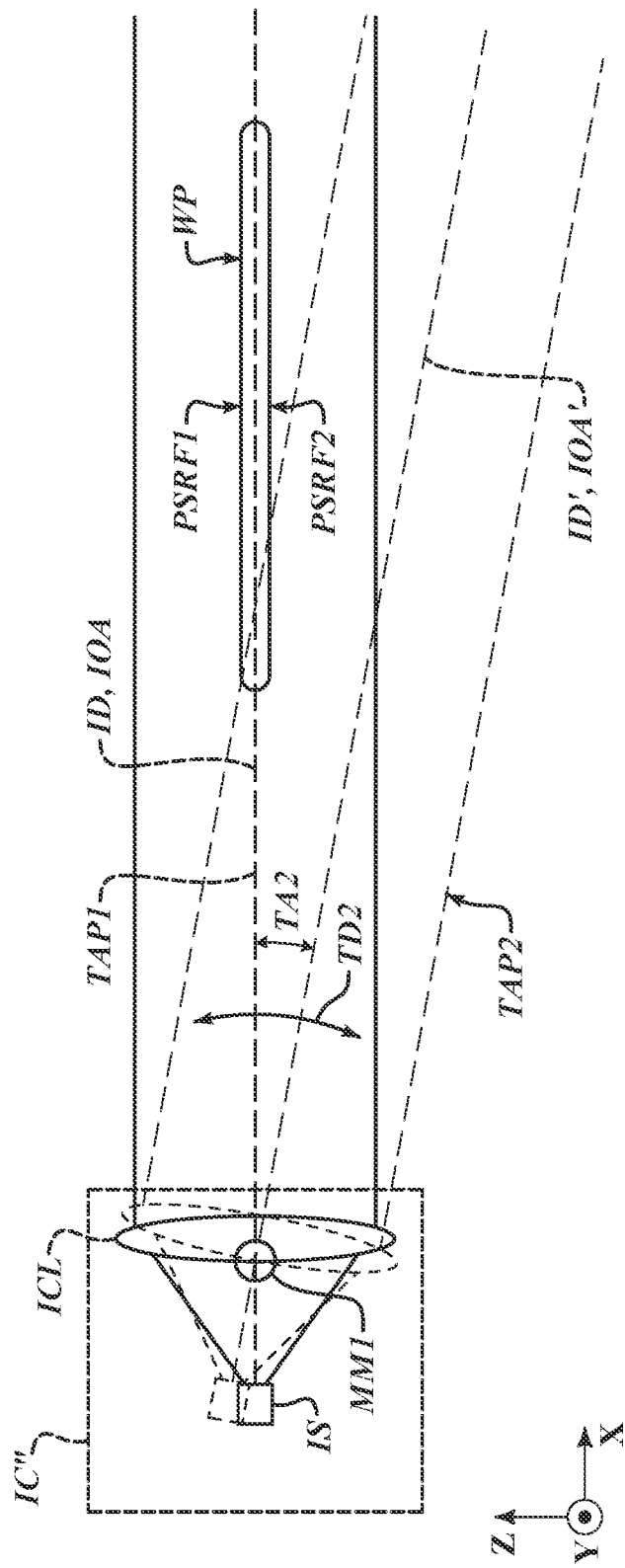
FIG. 11 is a diagram of an illumination configuration in which an orientation of an illumination source and an illumination lens is adjustable for orienting an illumination direction to be nominally parallel with first and second planar surfaces of a circular workpiece.
Figure 12:
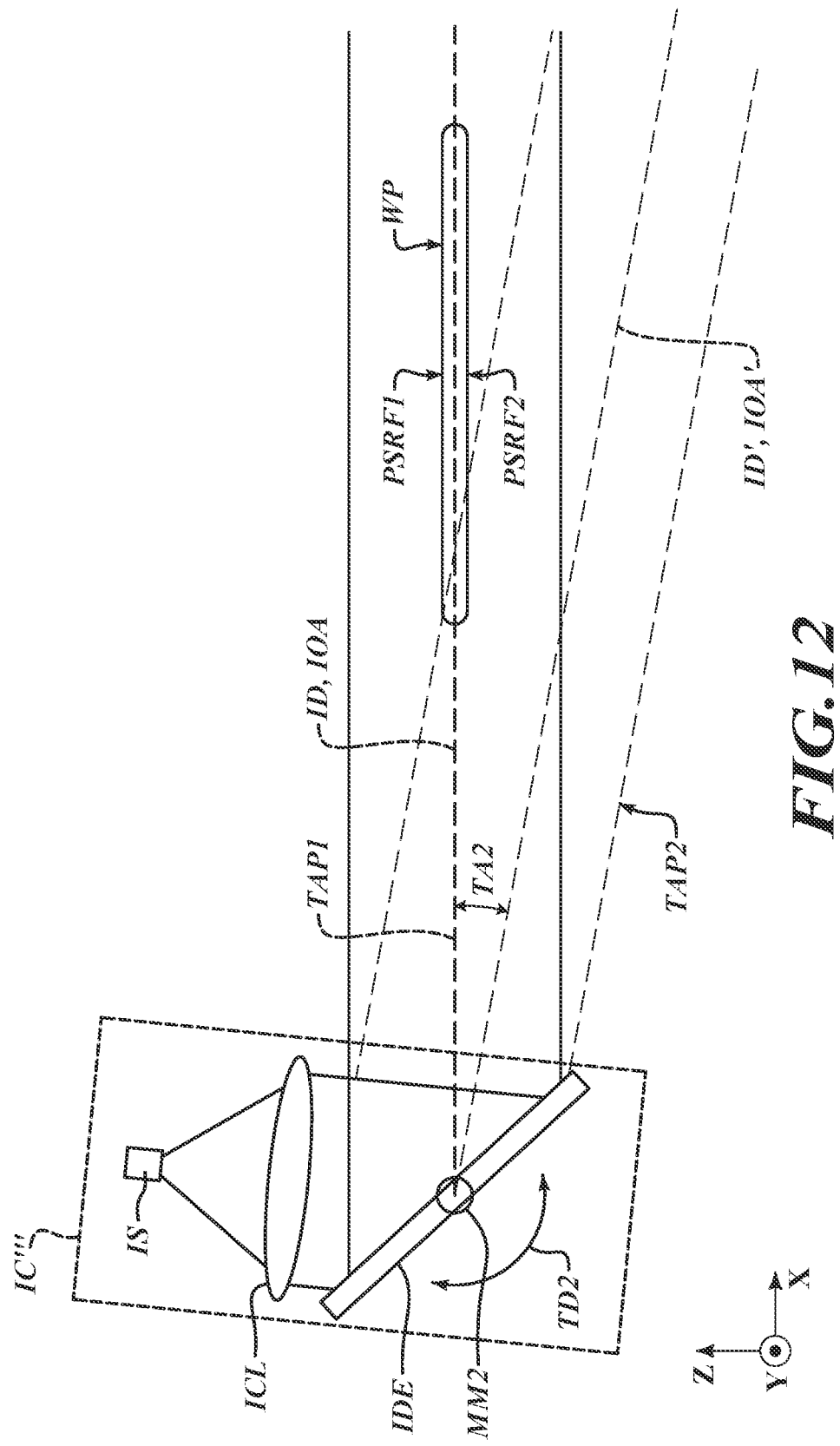
FIG. 12 is a diagram of an illumination configuration in which an orientation of an illumination directing element is adjustable for orienting an illumination direction to be nominally parallel with first and second planar surfaces of a circular workpiece.

The second tilt direction TD2 is generally perpendicular to the top and bottom planar surfaces PSRF1 and PSRF2 of the workpiece WP in the X-Z plane. The second tilt direction TD2 indicates the direction along which light rays LR may be adjusted or tilted to minimize, or to eliminate, the second tilt angle TA2, as illustrated in FIGS. 11 and 12, which are side views. The second tilt angle TA2 is an angle of the illumination direction ID relative to the first and second planar surfaces PSRF1 and PSRF2 in the X-Z plane. Tilting along the second tilt direction TD2 may be employed in some implementations to align the light rays LR with the edge of the workpiece, as discussed in more detail below with reference to FIGS. 11 and 12.

Figure 5A:
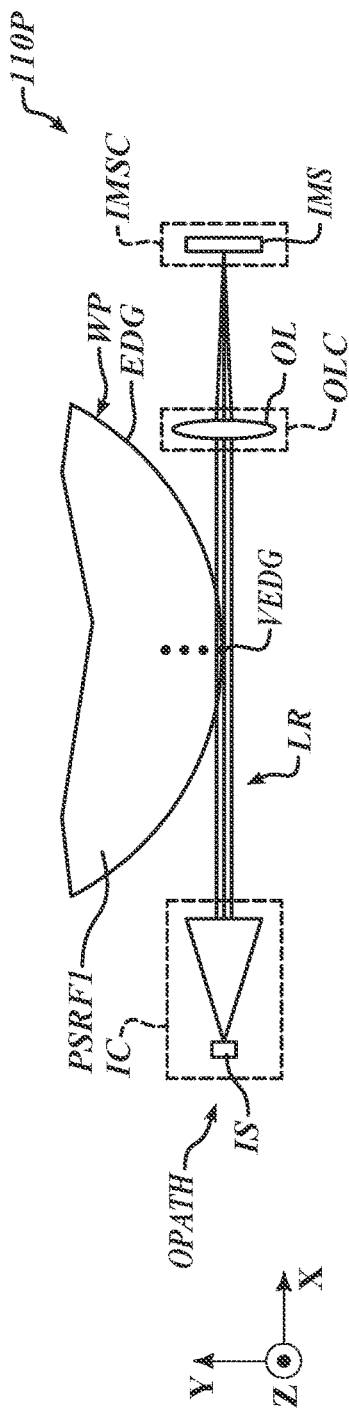
FIGS. 5A and 5B are diagrams illustrating a prior art imaging portion.
Figure 5B:
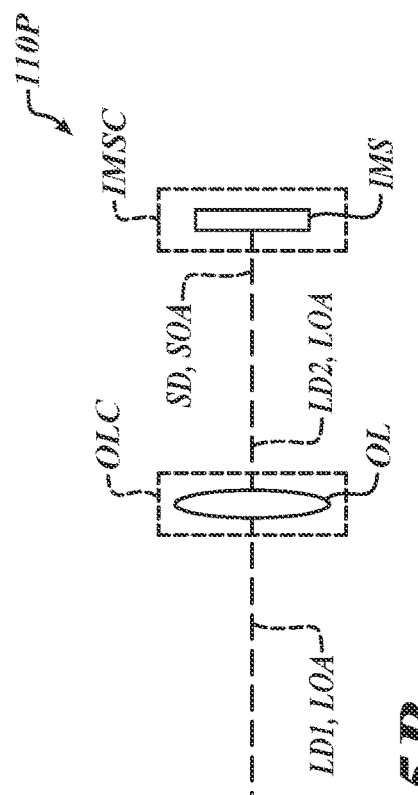

FIGS. 5A and 5B are diagrams illustrating a prior art imaging portion 110P, with FIG. 5A illustrating the path of the light rays LR, and FIG. 5B illustrating the optical axes which would otherwise be obscured by the light rays LR of FIG. 5A. The imaging portion 110P includes an illumination configuration IC, an objective lens configuration OLC and an image sensor configuration IMSC. As described above, the illumination configuration IC includes an illumination source IS and is configured to direct light in an illumination direction ID (e.g., that is coaxial or parallel with an illumination optical axis IOA). The objective lens configuration OLC includes an objective lens OL and has a lens optical axis LOA (e.g., which may correspond to the optical axis of the objective lens OL). A first lens direction LD1 is from the objective lens configuration OLC toward the illumination configuration IC and is coaxial or parallel with the lens optical axis LOA. A second lens direction LD2 is from the objective lens configuration OLC toward the image sensor configuration IMSC, and is coaxial or parallel with the lens optical axis LOA. The image sensor configuration IMSC includes an image sensor IMS (e.g., a CCD image sensor, etc.). The image sensor configuration IMSC is oriented in a sensor direction SD which is coaxial or parallel with a sensor optical axis SOA (e.g., which may intersect with a center of a sensor array and be perpendicular to a plane of the sensor array of the image sensor IMS).

In various implementations, the illumination configuration IC, the objective lens configuration OLC and the image sensor configuration IMSC form an optical path OPATH along which illumination (e.g., including light rays LR) from the illumination configuration IC travels. The illumination configuration IC is configured to provide illumination in the illumination direction ID (e.g., corresponding to a direction of light rays LR) toward at least a portion of an edge EDG, as illustrated, a viewed edge VEDG, of a circular workpiece WP (e.g., illustrated as a semiconductor wafer in the present example) that is along the optical path. The objective lens configuration OLC directs illumination toward the image sensor configuration IMSC which is configured to provide an image corresponding to the viewed edge VEDG of the circular workpiece WP. In FIGS. 5A and 5B, the illumination optical axis IOA, the lens optical axis LOA and the sensor optical axis SOA are generally coaxial or parallel. The conventional configuration of FIGS. 5A and 5B may result in the generation of problematic images, such as discussed above with reference to the edge distortion effects illustrated by images IMG-A and IMG-B of FIGS. 3A and 3B.

Figure 6A:
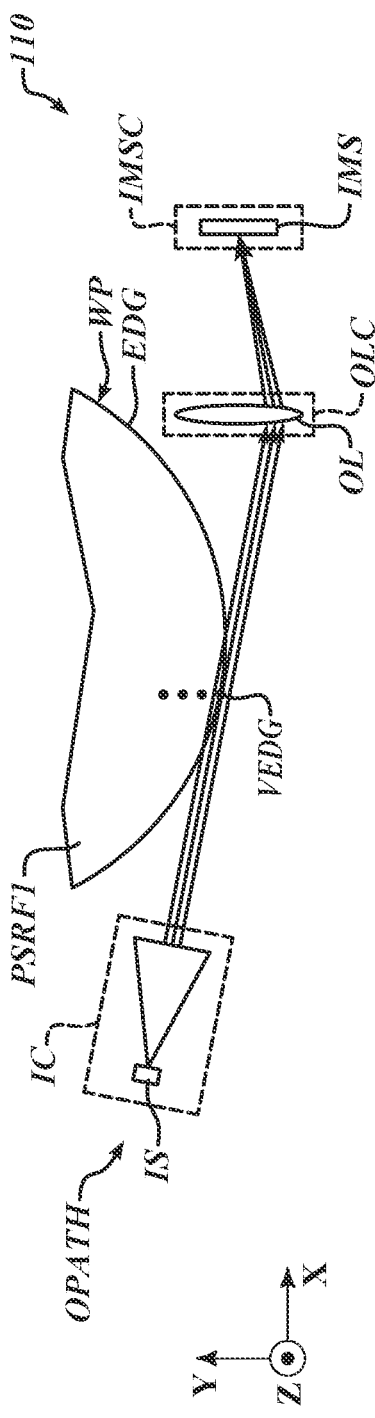
FIGS. 6A and 6B are diagrams illustrating an imaging portion including an illumination configuration providing illumination in an illumination direction that is at a first tilt angle in relation to an optical axis of an objective lens configuration.
Figure 6B:
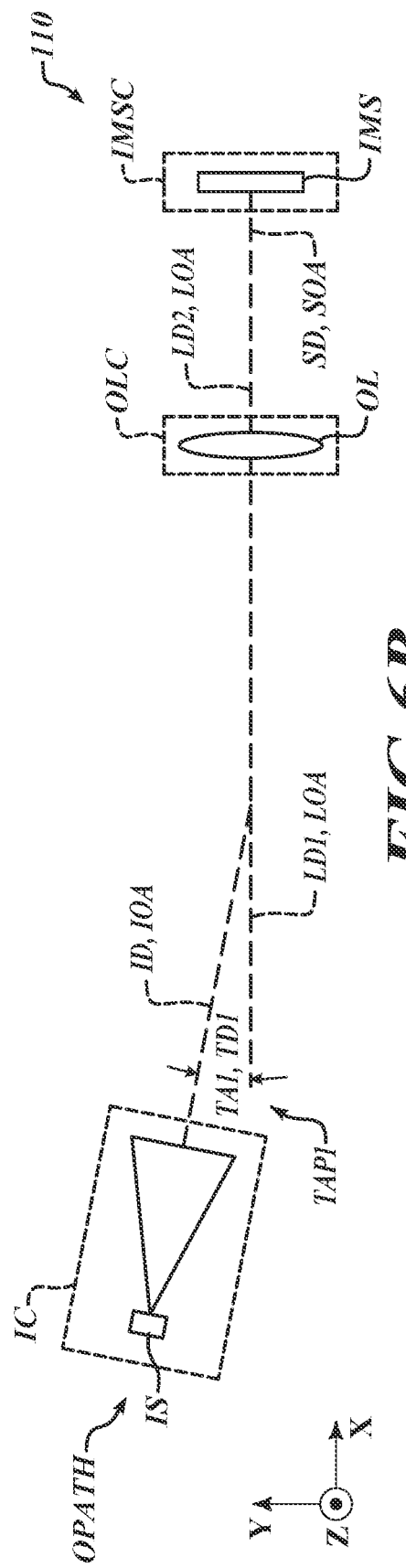

FIGS. 6A and 6B are diagrams illustrating an imaging portion 110 corresponding to the imaging portion of FIG. 1 and including an illumination configuration IC providing illumination in an illumination direction ID that is at a first tilt angle TA1 in relation to an optical axis LOA of an objective lens configuration OLC, as discussed in more detail above in the description of FIG. 1. FIG. 6A illustrates the path of the light rays LR, and FIG. 6B illustrates the optical axes which would otherwise be obscured by the light rays LR illustrated in FIG. 6A.

As illustrated in FIGS. 6A and 6B, the imaging portion 110 includes an illumination configuration IC, an objective lens configuration OLC and an image sensor configuration IMSC. The illumination configuration IC includes an illumination source IS and is configured to direct light in an illumination direction ID (e.g., that is coaxial or parallel with an illumination optical axis IOA).

The objective lens configuration OLC includes an objective lens OL and has a lens optical axis LOA (e.g., which may correspond to the optical axis of the objective lens OL). A first lens direction LD1 is from the objective lens configuration OLC toward the illumination configuration IC and is coaxial or parallel with the lens optical axis LOA. A second lens direction LD2 is from the objective lens configuration OLC toward the image sensor configuration IMSC and is generally coaxial or parallel with the lens optical axis LOA. The image sensor configuration IMSC includes an image sensor IMS. The image sensor configuration IMSC is oriented in a sensor direction SD which is coaxial or parallel with a sensor optical axis SOA (e.g., which may intersect with a center of a sensor array and be perpendicular to a plane of the sensor array of the image sensor IMS).

In various implementations, the illumination configuration IC, the objective lens configuration OLC and the image sensor configuration IMSC form an optical path OPATH along which illumination (e.g., including light rays LR) from the illumination configuration IC travels. The illumination configuration IC is configured to provide illumination in the illumination direction ID (e.g., corresponding to a direction of light rays LR) toward at least a portion of an edge EDG, as illustrated a viewed edge VEDG, of a circular workpiece WP (e.g., illustrated as a semiconductor wafer in the present example) that is along the optical path. At least part of the illumination configuration IC is tilted relative to the objective lens configuration OLC such that the illumination direction ID is at a first tilt angle TA1 in relation to the lens optical axis LOA of the objective lens configuration OLC. The objective lens configuration OLC directs illumination toward the image sensor configuration IMSC which is configured to provide an image corresponding to the viewed edge VEDG of the circular workpiece WP.

In various implementations, a first tilt direction TD1 corresponds to the first tilt angle TA1 and is parallel to the first and second planar surfaces. In various implementations, the first tilt direction TD1 and the first tilt angle TA1 may be referenced as laying or otherwise being within a first tilt angle plane TAP1 (e.g., that is parallel to the first and second planar surfaces PSRF1 and PSRF2).

As indicated above, during operation of the metrology system 100, light rays LR originating from the illumination configuration IC pass through the objective lens configuration OLC and are gathered by the image sensor configuration IMSC. An image (e.g., a shadow image) corresponding to the viewed edge VEDG of the workpiece WP is captured by the image sensor configuration IMSC.

As discussed above, the first tilt angle TA1 may correspond to an adjustment along the first tilt direction TD1, such that the illumination optical axis IOA is slightly non-coaxial or non-parallel with respect to the lens optical axis LOA. This adjustment capability facilitates reducing edge distortion effects, such as the edge distortion effects illustrated in FIGS. 3A and 3B. The first tilt angle TA1 may be selected to be small enough that the un-scattered illumination is captured by the objective lens OL to create the shadow image. For example, as discussed in more detail below, in various implementations the first tilt angle TA1 may be selected so as to be slightly smaller than the numerical aperture (NA) of the objective lens configuration OLC. Due to the tilt, the shallow angle reflections from the edge of the workpiece may be outside the numerical aperture (NA) of the objective lens configuration, and not be captured by the objective lens.

Providing an illumination direction ID that is at the first tilt angle TA1 in relation to the optical axis LOA of the objective lens configuration OLC by tilting the illumination configuration IC changes the portion the edge EDG of the workpiece WP that is being viewed, or the viewed edge VEDG, which may cause the image plane to be slightly deviated from normal with respect to the workpiece WP. In various implementations, the effect may be relatively small (e.g., an effect similar to a 0.5% horizontal compression of the image), and may be corrected in a fit analysis, or may be corrected by tilting the image sensor IS of the image sensor configuration IMSC, such as discussed below with reference to FIGS. 7A and 7B.

Figure 7A:
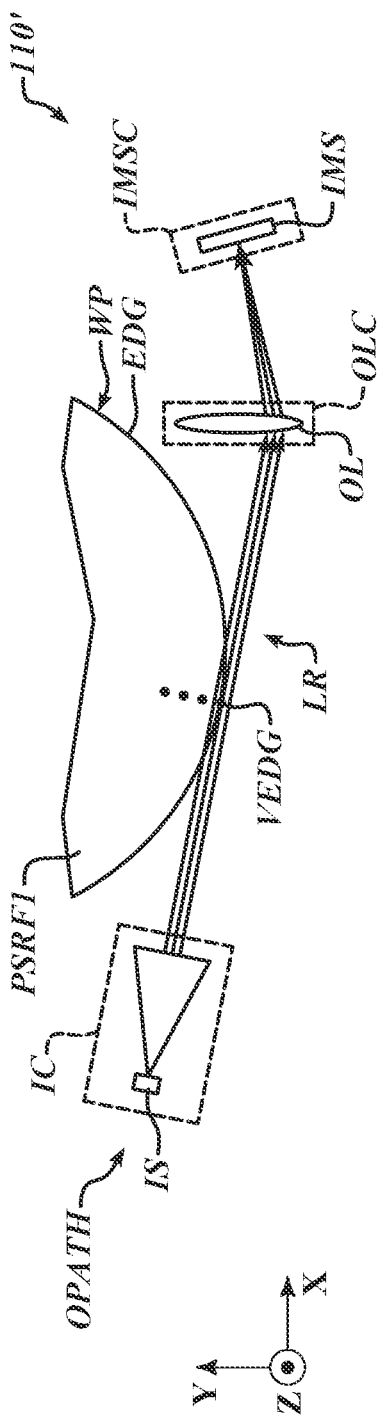
FIGS. 7A and 7B are diagrams illustrating an imaging portion similar to that of FIGS. 6A and 6B and also in which an image sensor is tilted according to a sensor tilt angle.
Figure 7B:
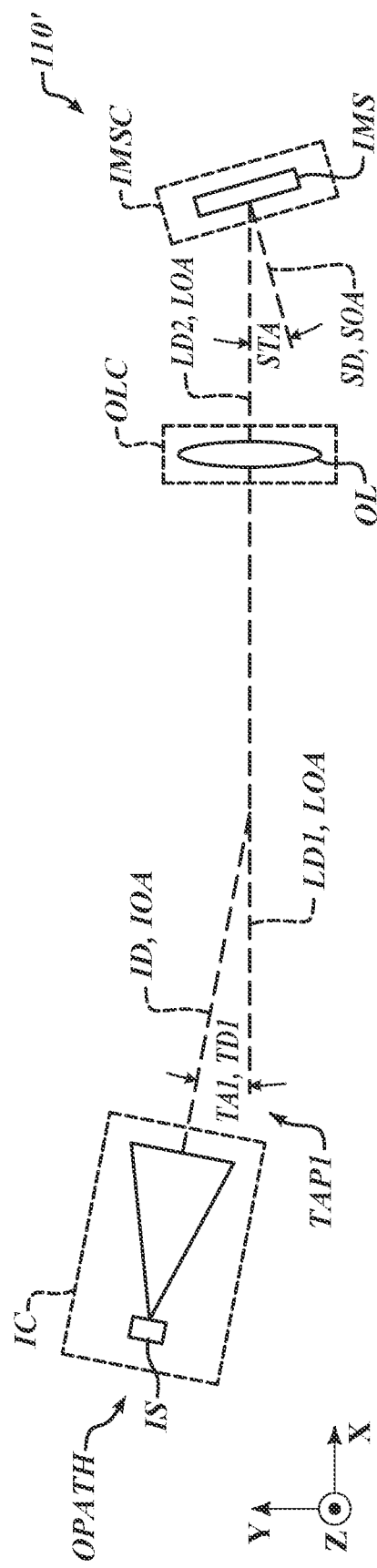

FIGS. 7A and 7B are diagrams illustrating an imaging portion 110' similar to that of FIGS. 6A and 6B, and also in which the image sensor IMS of the image sensor configuration IMSC is tilted according to a sensor tilt angle STA. Tilting the image sensor configuration IMSC according to the sensor tilt angle STA facilitates correcting deviation in the image plane from normal that is introduced by tilting the illumination configuration IC at the first tilt angle TA1 in relation to the optical axis LOA of the objective lens configuration OLC. FIG. 7A illustrates the path of the light rays LR, and FIG. 7B illustrates the optical axes which would otherwise be obscured by the light rays LR illustrated in FIG. 7A.

As illustrated in FIGS. 7A and 7B, the imaging portion 110' includes an illumination configuration IC, an objective lens configuration OLC and an image sensor configuration IMSC. The configuration and operation of the components of FIGS. 7A and 7B will be understood to correspond to the description of FIGS. 6A and 6B above, unless as otherwise described below. As shown in FIG. 7B, the image sensor configuration IMSC includes an image sensor IMS. The image sensor configuration IMSC is oriented in a sensor direction SD which is coaxial or parallel with a sensor optical axis SOA (e.g., which may intersect with a center of a sensor array and be perpendicular to a plane of the sensor array of the image sensor IMS). The image sensor IMS is tilted at a sensor tilt angle STA in relation to the lens optical axis LOA. As indicated above, providing a sensor direction SD that is tilted at a sensor tilt angel STA in relation to the lens optical axis LOA facilitates correcting deviations from normal in the image plane introduced by the tilting of the illumination direction ID in relation to the lens optical axis LOA.

In relation to such concepts, in various implementations, the viewed edge VEDG in FIG. 5A may be characterized as being according to a "radial slice" of the workpiece WP (e.g., in accordance with a representative indicator including 4 dots in a vertical orientation above the viewed edge VEDG as indicating a radial slice). As illustrated in FIG. 6B, the viewed edge VEDG has been shifted to the left (i.e., in accordance with the tilting of at least part of the illumination configuration IC), and which in some implementations in accordance with the representative indicator still being in a vertical orientation may no longer correspond to a radial slice (e.g., as corresponding to a deviation from normal in the image plane introduced by the tilting of the illumination direction ID in relation to the lens optical axis LOA, and as in some implementations may be characterized a resulting in an affect similar to a slight horizontal compression of the resulting image). As illustrated in FIG. 7B, in various implementations such affects may be corrected by tilting the image sensor configuration IMSC according to the sensor tilt angle STA (i.e., as resulting in the viewed edge VEDG with the representative indicator tilted to again correspond to a radial slice).

In various implementations, the amount of the first tilt angle TA1 (e.g., as illustrated in FIGS. 6A-6B and 7A-7B), may be related to various factors. For example, the first tilt angle TA1 may be related to the numerical aperture (NA) (e.g., of the objective lens OL). As is generally known in the art, the numerical aperture (NA) of an optical system such as an objective lens is defined by the following relationship (Equation 1):

$$NA = n\sin(\theta)$$

where n is the index of refraction of the medium in which the lens is working (e.g., 1.00 for air), and θ is the maximal half-angle of the cone of light that can enter or exit the lens. In further regard to the numerical aperture NA and certain corresponding relationships, in the description below, certain equations (i.e., Equations 2-3) are with respect to NA constraints for a co-axial/non-tilted arrangement (e.g., as illustrated in FIGS. 5A-5B), as followed by certain equations (i.e., Equations 4-6) that are with respect to NA constraints for a tilted arrangement (e.g., as illustrated in FIGS. 6A-6B and 7A-7B).

In certain implementations, NA constraints for a co-axial/non-tilted arrangement (e.g., as illustrated in FIGS. 5A-5B, where the illumination optical axis IOA may be co-axial and/or non-tilted with respect to the lens optical axis LOA), may be indicated by the following relationship (Equation 2):

$$NA_{MAX} = \sin\left[\operatorname{atan}\left[\frac{R\left\{1 - \sqrt{1 - \left(\frac{WD}{R}\right)^2}\right\}}{WD}\right]\right]$$

where R is the radius of the workpiece WP (e.g., with R=150 mm in one specific numerical example), and WD is the working distance (e.g., between the objective lens OL and an object plane of the workpiece WP). The limitation arises from physical interference of the workpiece WP (e.g. a wafer) and the objective lens OL. This equation generally assumes that the working distance WD may be less than the radius R (e.g., as may likely be the case in certain applications, such as those requiring a resolution of a few microns, etc.) In various implementations, the object plane may be at the viewed edge VEDG, for which the working distance WD may be the distance between the viewed edge VEDG and the objective lens OL. In certain implementations, it may be desirable for the configuration to utilize a relatively large working distance WD (e.g., to allow the objective lens OL to clear the circular workpiece WP). As one specific numerical example, in some configurations the working distance may be greater than 60 mm. The resolution may be indicated by the following relationship (Equation 3):

$$\text{Resolution} \cong \lambda/(2*NA)$$

where $\lambda$ is the wavelength of the illumination.

In various implementations, it may be desirable for the configuration to have a large enough NA to achieve a certain resolution. In one specific numerical example where it is desirable to achieve an optical resolution of a few microns, some specific values may include an accuracy target of 10 microns, for which it may be desirable to have a resolution that is lower than this value (e.g., such as targeting 3 microns for the optical resolution). It may also be desirable for the configurations to have a telecentric arrangement (e.g., for which the objective lens configuration OLC and/or objective lens OL may include multiple lenses and/or a telecentric aperture for achieving a telecentric arrangement). In further regard to tilted arrangements (e.g., as illustrated in FIGS. 6A-6B and 7A-7B), in various implementations a maximum NA to be used with the tilted arrangement may be approximately half of the theoretical maximum for a corresponding co-axial (non-tilted) arrangement (e.g., as indicated by Equation 2 above). This may be due to the fact that in the titled arrangements the illumination configuration IC may in certain implementations be rotated toward the workpiece WP by an amount nearly equal to the NA. The maximum NA (i.e., $NA_{MAX\_Tilted}$) to be used with the tilted arrangement may thus be indicated by the following relationship (Equation 4):

$$NA_{MAX\_Tilted} \cong NA_{MAX}/2$$

In various implementations, a maximum acceptable tilt angle $\text{Tilt}_{MAX}$ of the arrangement may be indicated by the following relationship (Equation 5):

$$\text{Tilt}_{MAX} = a\sin(NA)$$

In various implementations, a recommended tilt angle $\text{Tilt}_{Recommended}$ may be indicated by the following relationship (Equation 6):

$$\text{Tilt}_{Recommended} \geq 3/4 * \text{Tilt}_{MAX}$$

As some specific numerical examples in relation to the above equations, in a configuration where R=150 mm and WD=77 mm, then in accordance with Equation 2, $NA_{MAX}$=0.27. In a tilted arrangement, in accordance with Equation 4, $NA_{MAX\_Tilted}$=0.135, and in accordance with Equation 5, $\text{Tilt}_{MAX}$=7.7 degrees, and in accordance with Equation 6, $\text{Tilt}_{Recommended}$=5.8 degrees (i.e., which may correspond to the first tilt angle TA1=5.8 degrees). The resolution (e.g., with a wavelength of illumination of 450 nm)=1.66 um.

As indicated by the above equations and examples, the first tilt angle TA1 as utilized in a given configuration (e.g., as illustrated in FIGS. 6A-6B and 7A-7B) may be determined in accordance with certain related factors (e.g., a given working distance WD, etc.) As some additional specific numerical examples related to some commercially available stock objective lenses, in some instances, working distances WD may be utilized that range from approximately 60 mm to 80 mm, with NAs that range from approximately 0.7 to 0.9, with resolutions that range from approximately 3 um to 4 um, and corresponding first tilt angles TA1 that range from approximately 3 degrees to 5 degrees. In certain implementations (e.g., in relation to certain practical considerations, etc.) it may be desirable for the first tilt angle TA1 to be at least 1 degree, or at least 2 degrees, etc.

As another aspect, in certain implementations the sensor tilt angle STA of FIGS. 7A and 7B and the first tilt angle TA1 may have the following relationship (Equation 7):

$$STA = a\tan(M(\tan(TA1)))$$

where M is the magnification of the arrangement (e.g., corresponding to the magnification of the objective lens OL and/or objective lens configuration OLC).

It is noted that use of a single-color (non-white) illumination source IS with an associated wavelength (e.g., as corresponding to and/or representative of a relatively narrow band of wavelengths as understood by one skilled in the art) may be desirable in certain implementations (e.g., for reducing any smearing from chromatic aberration in tilted configurations, such as those of FIGS. 6A-6B and 7A-7B). In addition, when the workpiece WP may be semi-transparent (e.g., a semi-transparent wafer), it may be desirable to utilize an illumination source IS that provides illumination with a color/wavelength that is outside of the range of colors/wavelengths that the workpiece is transparent in relation to. When utilizing such a configuration, the shadow of the edge EDG of the semi-transparent workpiece may appear in an image in a similar manner as that of an opaque (i.e., non-transparent) workpiece (e.g., as may be desirable for an accurate representation of the edge EDG in the image). As a specific example, when a workpiece WP is a silicon carbide (SiC) wafer, which may be a transparent green, an illumination source IS may be utilized which provides blue light (e.g., with a wavelength of 450 nm), at which wavelength the workpiece WP may be relatively opaque (e.g., for producing a shadow image with an accurate representation of an edge EDG of a workpiece WP, such as that of the image IMC-C of FIG. 3C).

As illustrated and as will be described in more detail below with respect to FIG. 8, one issue that may occur when directing illumination toward an edge EDG of a workpiece is that low angled scattered light may result. In various implementations, a relatively significant amount of low angled scattered light may result from low angle reflections (e.g., as occurring due to the edge of the circular workpiece WP being polished or otherwise finished in such a manner such that low angle reflections may occur, in addition to the fact that the rounded/circular edge EDG may have a relatively large cross-section in the optical path OPATH, in particular when the circular workpiece WP is relatively large, such as one having a 150 mm radius). Such corresponding low angled scattered light may cause unwanted effects in a corresponding image, if not addressed. For example, such low angled scattered light in a configuration such as that of FIGS. 5A and 5B may affect/appear in an image so as to at least in part result in a ringing effect (e.g., as illustrated in the example images IMG-A and IMG-B of FIGS. 3A and 3B). The tilted configurations of FIGS. 6A-6B and 7A-7B operate to prevent at least some of the low angled scattered light from affecting/appearing in a corresponding image (e.g., as may depend in part on the size of the first tilt angle TA1). In some implementations, it may be desirable to utilize a relatively smaller first tilt angle TA1 (e.g., smaller than a maximum and/or recommended tilt angle), for which a modified aperture may additionally be utilized to block at least some of the low angled scattered light, as will be described in more detail below with respect to FIG. 8.

Figure 8:
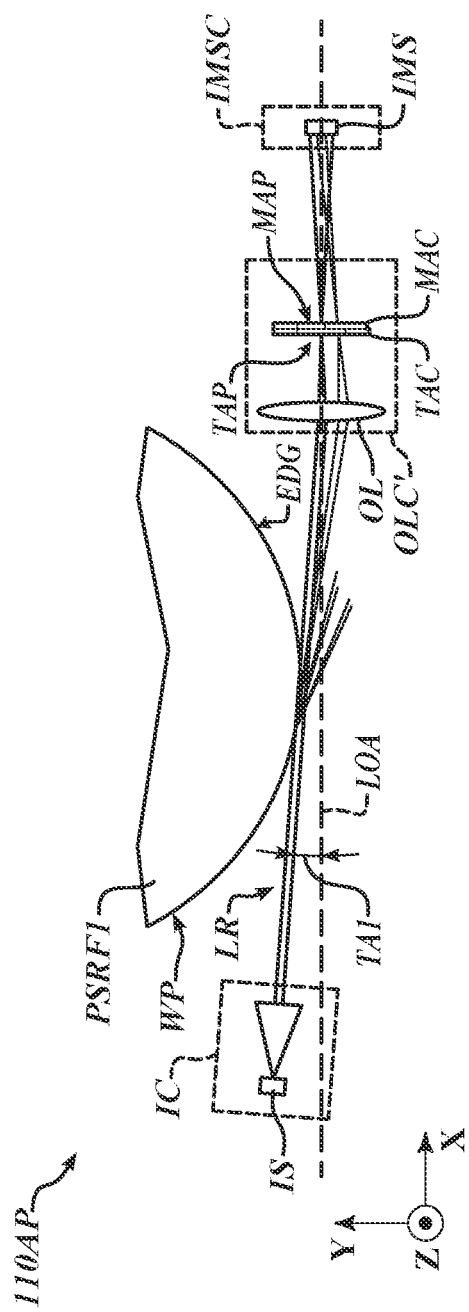
FIG. 8 is a diagram of an imaging portion with an objective lens configuration including at least one of a telecentric aperture component or a modified aperture component.

FIG. 8 is a diagram of an imaging portion 110AP with an objective lens configuration OLC' including at least one of a telecentric aperture component TAC or a modified aperture component MAC. The imaging portion 110AP of FIG. 8 may be otherwise similar to the imaging portion 110 of FIGS. 6A and 6B, or the imaging portion 110' of FIGS. 7A and 7B. The telecentric aperture component TAC includes a telecentric aperture TAP and the modified aperture component MAC includes a modified aperture MAP. In various implementations, the telecentric aperture TAP may be utilized to achieve a telecentric configuration, as is known in the art. In various implementations, the telecentric aperture component TAC and/or the corresponding telecentric aperture TAP may be included as part of the objective lens OL, and/or may be included in the objective lens configuration OLC', as indicated in the illustration of FIG. 8. In various implementations, one purpose of the configuration is to block low angle scattered light in order to reduce the edge distortion (e.g., reduce the edge ringing as illustrated in FIGS. 3A and 3B).

In one implementation the tilt angle TA1 is sufficiently large (e.g., 6.5 degrees in one particular numerical example), that the low angle scattered light may be directed below the telecentric aperture TAP so as to be blocked by the telecentric aperture component TAC. Alternatively, if the tilt angle TA1 is somewhat smaller (e.g., as may provide certain advantages in some implementations, such as at five degrees in one specific numerical example), at least some of the low angle scattered illumination may still pass through a standard telecentric aperture TAP, in which case it may be desirable to alternatively utilize a modified aperture component MAC with the modified aperture MAP which may block more of the low angle scattered illumination, such as illustrated in the configuration of FIG. 8. As indicated, the modified aperture MAP may be asymmetric about the lens optical axis LOA (e.g., smaller than the telecentric aperture TAP on at least one side for better blocking the low angle scattered illumination). It will be appreciated that in a configuration in which both the standard telecentric aperture TAP and the modified aperture MAP are utilized, the effect may be similar to that of utilizing just the modified aperture MAP (i.e., due to the modified aperture MAP being smaller than the telecentric aperture TAP).

In various implementations (e.g., as will be described in more detail below with respect to FIGS. 9, 10A and 10B), an illumination aperture size (e.g., fiber size, rectangular aperture, and/or a spatial filter size or shape) may be chosen in order to reduce the coherence in edge reflections. In various implementations, a preferred spatial resolution of an edge may result from configuration with a large fiber size, but this also may inhibit the measurement of workpiece thickness, as well as inhibiting imaging of long top and bottom planar surfaces of a workpiece. An asymmetric aperture may provide a good compromise between these effects. In various implementations, this effect may have a smaller benefit than the tilted illumination approach, but may serve to increase the spatial resolution by allowing a smaller tilt of the tilted illumination approach.

Figure 9:
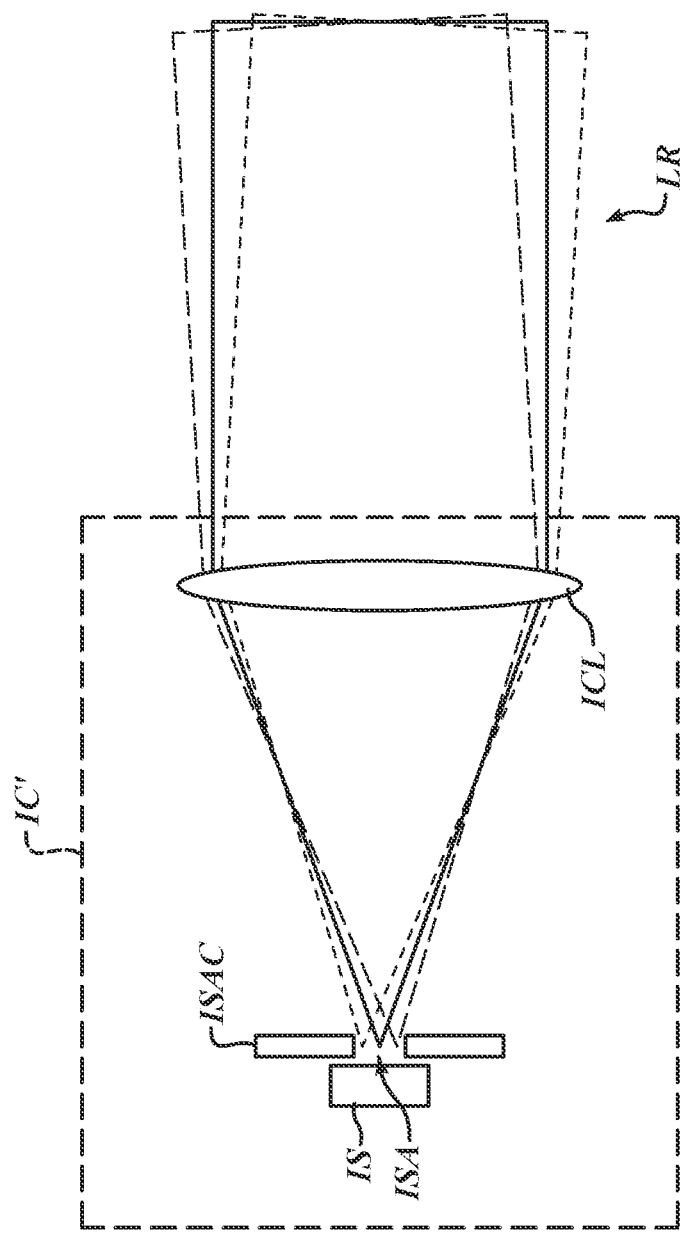
FIG. 9 is a diagram of an illumination configuration including an illumination source aperture.

FIG. 9 is a diagram of an illumination configuration IC' including an illumination source IS, an illumination source aperture component ISAC, and an illumination collimation lens ICL. The illumination source aperture component ISAC, as illustrated, has an illumination source aperture ISA. In some implementations, the illumination source aperture component ISAC has a round illumination source aperture ISA and is positioned close to the illumination source IS and in the direction of propagation of light from the illumination source IS to the illumination collimation lens ICL. Light emitted by the illumination source IS passes through the illumination source aperture ISA of the illumination source aperture component ISAC, and is collimated by the illumination collimation lens ICL, producing collimated light rays LR. In some implementations, the illumination source aperture component ISAC may be multi-mode optical cable, with the illumination source aperture ISA corresponding to a size of the optical cable.

The illumination source IS may be temporally or spatially incoherent, or both, and the coherence of the light emitted by the illumination source in the direction of propagation may be small, for example, on the order of a few micrometers. The spatial coherence of the collimated beam emitted by the illumination collimation lens ICL is a function of angular and spatial mixing of the incoherent modes of light passing through the illumination source aperture ISA, and the angular and spatial mixing are a function of the size of the illumination source aperture ISA. A larger illumination source aperture ISA allows for more mixing, which results in a smaller spatial coherence and an increased range of angles. Reduced spatial coherence sharpens a shadow image of an edge (see edge EDG of image IMG-C of FIG. 3C), which is desirable. An increased range of angles blurs the top and bottom planar surfaces of the shadow image, which is undesirable. As a specific numerical example, in one configuration it has been determined by experimenting with round apertures (e.g., fiber) diameters of 50 microns, 200 microns and 1000 microns, that the 200-micron aperture appears to be optimized for a specific example configuration.

Figure 10B:
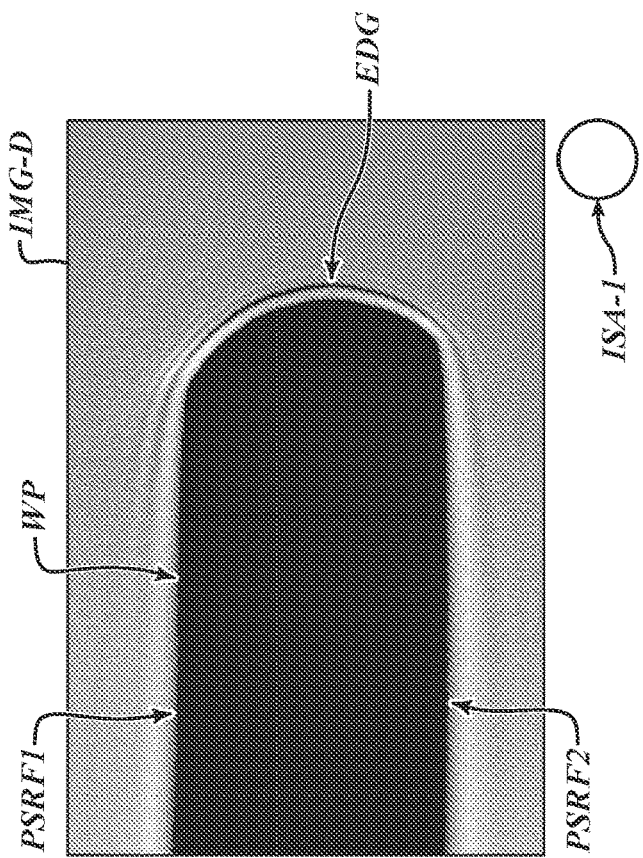
FIGS. 10A and 10B are diagrams including images corresponding to an edge of a circular workpiece as resulting from utilizing different shaped illumination source apertures in the configuration of FIG. 9.
Figure 10A:
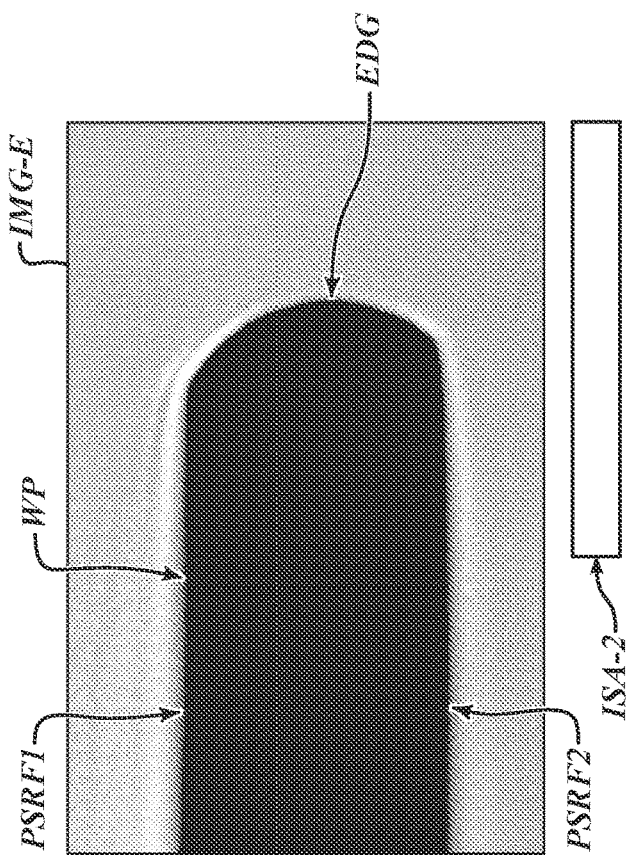

FIGS. 10A and 10B are diagrams including images IMG-D and IMG-E corresponding to an edge EDG of a circular workpiece WP as resulting from utilizing different shaped illumination source apertures ISA-1 and ISA-2, respectively, in the configuration of FIG. 9. The illumination source aperture ISA-1 utilized to capture image IMG-D of FIG. 10A is a round fiber aperture. Using a round aperture, such as the illumination source aperture ISA-1 of FIG. 10A, facilitates reducing the spatial coherence, sharpening the shadow image of the edge EDG, but the top and bottom planar surfaces PSRF1 and PSRF2 of the workpiece WP may be blurred. Use of a configuration employing tilting of the illumination direction ID in relation to the lens optical axis (See FIGS. 1, 6A, 6B, 7A and 7B), facilitates blocking the shallow reflections, but the effective numerical aperture of the objective configuration may be reduced, reducing the spatial resolution of the edge EDG. In some implementations, a smaller tilt angle may be employed (e.g., a smaller 5 degree tilt angle, instead of a larger 6.5 degree tilt angle), which may improve the spatial resolution. Edge distortion may still be visible, however, such as in the image IMG-D of FIG. 10A, which corresponds to an image captured using a round fiber aperture ISA-1 having a 200 micron diameter with an illumination configuration having a 5 degree tilt angle in relation to the lens optical axis.

The edge distortion can be further reduced using an asymmetrical illumination source aperture. The illumination source aperture ISA-2 utilized to capture image IMG-E of FIG. 10B is a rectangular fiber aperture having dimensions of 1000 microns by 175 microns, with the long axis oriented along the direction of the workpiece. Image IMG-E corresponds to an illumination configuration having a 5 degree tilt angle in relation to the lens optical axis. As compared to image IMG-D of FIG. 10A, the spatial coherence in the horizontal direction is suppressed in the image IMG-E of FIG. 10B, providing a sharper shadow edge EDG, with less blurring of the top and bottom surfaces PSRF1 and PSRF2 of the workpiece WP.

In various implementations (e.g., as will be described in more detail below with respect to FIGS. 11 and 12), the process of aligning of the illumination source IS with the workpiece WP may be simplified by adjusting a second illumination tilt angle TA2, rather than adjusting the workpiece WP. The tilt angle TA2 may be adjusted along a second tilt direction TD2 of the illumination rotation (see tilt direction TD2 of FIGS. 4, 11 and 12), with the second tilt direction TD2 being perpendicular to the top and bottom planar surfaces PSRF1 and PSRF2 in the X-Z plane. Prior art has included configurations for moving the workpiece (tilt and rotation stages) to optimize alignment of the illumination source and workpiece. However, it may be advantageously easier, in certain implementations, to utilize a relatively oversized illumination beam and rotate at least part of the illumination source. The second tilt angle TA2 may be adjusted along the second tilt direction TD2 until an apparent width of the shadow is minimized (e.g., as may correspond to a minimized or eliminated second tilt angle TA2).

FIG. 11 is a diagram of front or side view of an illumination configuration IC″ in which an orientation of an illumination source IS and an illumination configuration lens ICL is adjustable for orienting an illumination direction ID to be nominally parallel with first and second planar surfaces PSRF1 and PSRF2 of a circular workpiece WP. The illumination configuration IC″ includes a motion mechanism MM1 (e.g., a motor) which rotates or tilts the illumination source IS and the illumination configuration lens ICL. The illumination source IS may be, for example, a fiber output. The illumination configuration lens ICL may be, for example, a collimating lens. The second tilt direction TD2 is generally perpendicular to the top and bottom planar surfaces PSRF1 and PSRF2 of the workpiece WP in a second tilt angle plane TAP2, which is in the X-Z plane as illustrated in FIG. 11. The second tilt direction TD2 indicates the direction along which illumination direction ID′ or illumination optical axis IOA′ may be adjusted or tilted to minimize, or to eliminate, the second tilt angle TA2. The second tilt angle TA2 is an angle of the illumination direction ID′ or illumination optical axis IOA′ relative to the first and second planar surfaces PSRF1 and PSRF2 in the X-Z plane.

For example, the second tilt angle TA2 of illumination direction ID′ and illumination optical axis IOA′ relative to the first and second planar surfaces PSRF1 and PSRF2 in the X-Z plane may be minimized or eliminated by actuating the motion mechanism MM1 to rotate the illumination source IS and the illumination configuration lens ICL so that the illumination direction ID′ is rotated to correspond to the illumination direction ID (and the illumination optical axis IOA′ is rotated to correspond to the illumination optical axis IOA).

FIG. 12 is a diagram of a front or side view of an illumination configuration IC‴ in which an orientation of an illumination directing element IDE is adjustable for orienting an illumination direction ID to be approximately parallel with first and second planar surfaces PSRF1 and PSRF2 of a circular workpiece WP. The illumination configuration IC‴ includes an illumination source IS (e.g., a fiber output), an illumination configuration lens ICL (e.g., a collimating lens), the illumination directing element IDE, and a motion mechanism MM2 (e.g., a motor) which rotates or tilts the illumination directing element IDE. The illumination directing element IDE may be, for example, a prism, a steering mirror, etc.

The second tilt direction TD2 is generally perpendicular to the top and bottom planar surfaces PSRF1 and PSRF2 of the workpiece WP in a second tilt angle plane TAP2, which is in the X-Z plane as illustrated in FIG. 12. The second tilt direction TD2 indicates the direction along which illumination direction ID′ or illumination optical axis IOA′ may be adjusted or tilted to minimize, or to eliminate, the second tilt angle TA2. The second tilt angle TA2 is an angle of the illumination direction ID′ or illumination optical axis IOA′ relative to the first and second planar surfaces PSRF1 and PSRF2 in the X-Z plane.

For example, the second tilt angle TA2 of illumination direction ID′ and illumination optical axis IOA′ relative to the first and second planar surfaces PSRF1 and PSRF2 in the X-Z plane may be minimized or eliminated by actuating the motion mechanism MM2 to rotate the illumination directing element IDE so that the illumination direction ID′ is rotated to correspond to the illumination direction ID (and the illumination optical axis IOA′ is rotated to correspond to the illumination optical axis IOA).

It is noted that the first tilt direction TD1 is different from the second tilt direction TD2. The first tilt direction TD1 (see FIG. 4) is parallel to the top and bottom planar surfaces PSRF1 and PSRF2 of the workpiece WP in the first tilt angle plane TAP1, which is in the X-Y plane as illustrated in FIGS. 11 and 12.

In certain implementations the adjustments indicated by FIG. 11 or FIG. 12 may be performed each time measurement operations are to be performed (e.g., each time a new workpiece is placed on a stage and/or corresponding rotation mechanism RM of a system, such as the system 100 of FIG. 1, for measuring the edge of the workpiece). The adjustments may be made until an apparent width of a shadow is minimized (e.g., as corresponding to a minimized width between the first and second planer workpiece surfaces PSRF1 and PSRF2 in the associated image). This may correspond in one specific example to starting with an image such as image IMG-B of FIG. 3B, and making the adjustments until the first and second planer surfaces PSRF1 and PSRF2 appear as they do with a minimized width between them in the image IMG-C of FIG. 3C. Again, such a configuration may correspond to achieving a relatively minimized tilt angle TA2 (e.g., as one specific numerical example, it may be desirable for the tilt angle TA2 to be less than 0.07 degrees, for which such a configuration may be referenced as having a tilt angle TA2 of approximately/nominally zero degrees in certain implementations) with the illumination direction ID approximately/nominally parallel with the first and second planar workpiece surfaces PSRF1 and PSRF2.

Figure 13:
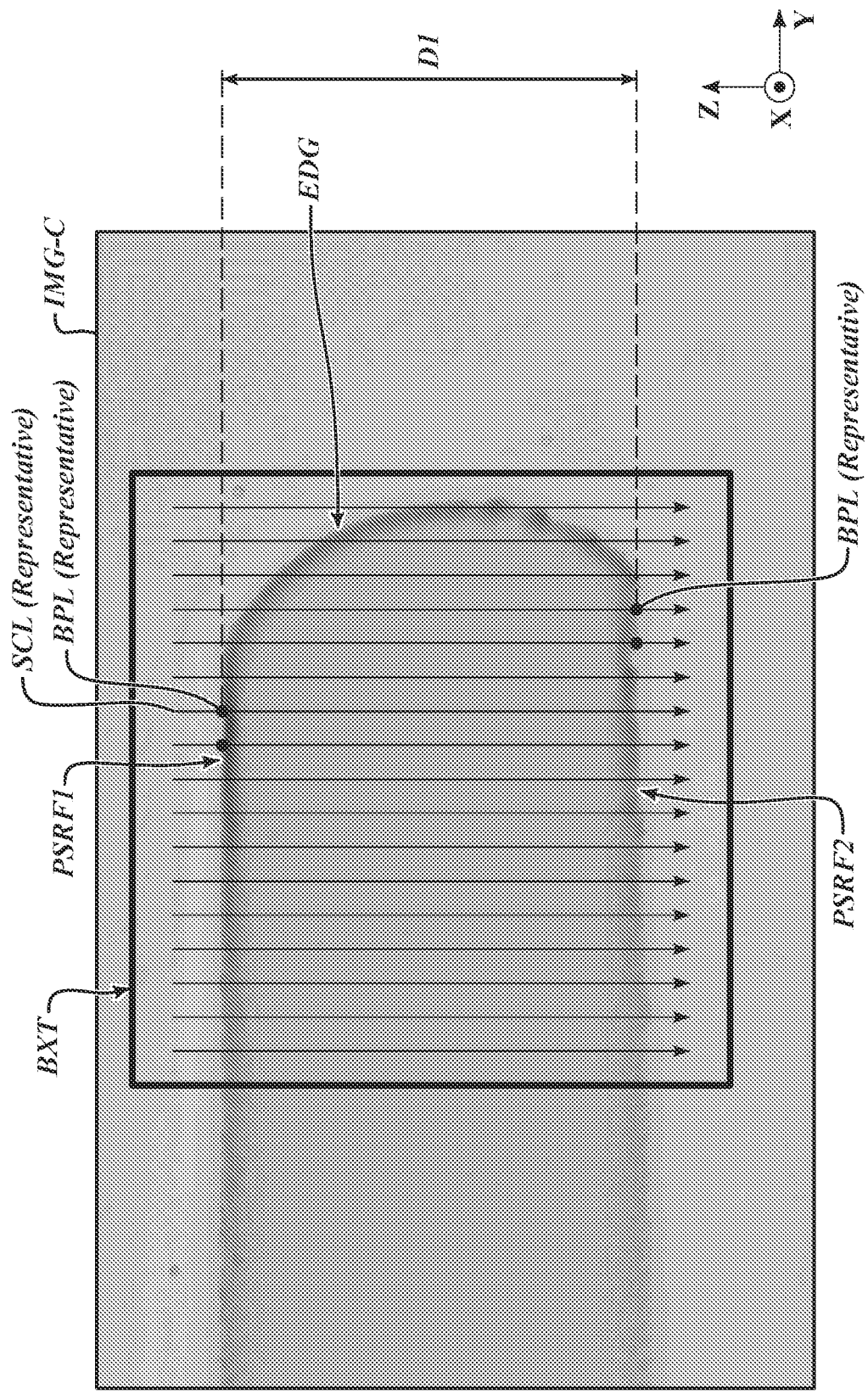
FIGS. 13 and 14 are diagrams illustrating metrology operations for performing measurements on an image corresponding to an edge of a circular workpiece.
Figure 14:
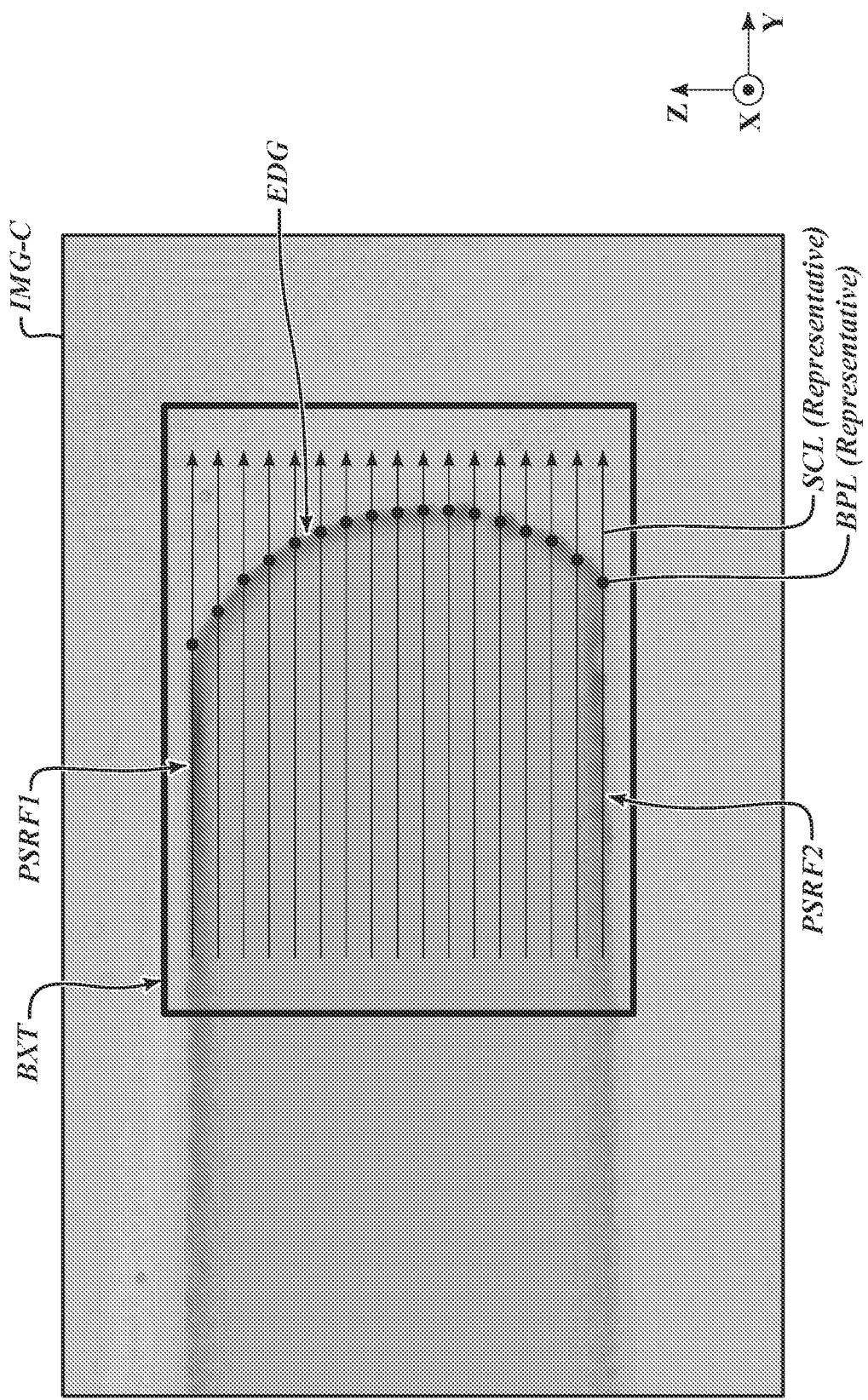

As noted above, the examples of FIGS. 11 and 12 may in certain implementations be generally described as illustrating techniques for adjusting the illumination direction ID to be nominally parallel to first and second planar surfaces PSRF1 and PSRF2 of a circular workpiece WP (e.g., as corresponding to minimizing the second tilt angle TA2). In contrast, in various implementations the first tilt angle TA1 may generally be set at a time of manufacturing and/or assembly, and for which the first tilt angle TA1 may not be configured to be adjustable by an end user. In certain alternative implementations, at least some adjustment may be enabled for the first tilt angle TAL. As a specific example, in one implementation the first tilt angle TA1 may be set at a particular value (e.g., 5 degrees) at a time of manufacturing and/or assembly. Thereafter, the first tilt angle TA1 may be configured to be at least partially adjustable by an end user (e.g., at least part of the illumination configuration IC may be adjustable for adjusting the first tilt angle TA1, so as to enable optimization of the system after manufacturing and/or assembly). In various implementations, such adjustments may be limited to a certain range of degrees for which the first tilt angle TA1 may be adjusted. For example, in some implementations the system may be configured to enable such adjustments only within a relatively small range (e.g., +/−0.5 degrees relative to the original 5 degree value set at the time of manufacturing) or a larger range (e.g., a range that falls between 1 degree and 10 degrees, etc.) FIGS. 13 and 14 are diagrams illustrating metrology operations for performing measurements on an image corresponding to an edge EDG of a circular workpiece WP. In the examples of FIGS. 13 and 14, one or more video tools or similar elements or operations may be utilized for performing the metrology operations (e.g., for determining certain dimensions/profiles, etc. of the edge/workpiece.) FIGS. 13 and 14 illustrate an image IMG-C (e.g., which may be similar to or the same as the image IMG-C of FIG. 3C) of an edge EDG of a workpiece WP (e.g., as acquired utilizing techniques as described herein).

A video box tool BXT is shown which includes scan lines SCL (e.g., which may also or alternatively be representative of video point tools, etc.) which are utilized for determining the boundary locations, dimensions, and/or other aspects of the edge EDG and/or workpiece WP. In various exemplary implementations, the video box tool BXT may be sized, positioned and rotated, until the box tool BXT is indicative of, or defines, the region of interest (e.g., the area within the box tool BXT), and the arrows shown in FIGS. 13 and 14 (e.g., representative of scan lines, point tools, etc.) may be utilized to determine the boundary(s) of the workpiece surfaces (e.g., including the edge EDG and/or the first and second planar surfaces PSRF1 and PSRF2 that the edge EDG is located between). In various exemplary embodiments, the video box tool BXT may generally use one or more conventional boundary gradient(s) along the boundary(s) of the surfaces (e.g., the edge EDG and/or the first and second planar surfaces PSRF1 and PSRF2) in the region of interest, and the boundaries of the surfaces may be determined based on the local magnitudes of the boundary gradient(s) along the various scan lines SCL, etc.

As shown in FIG. 13, in the display area, the box tool BXT with the scan lines SCL in a first orientation is utilized to determine the boundary locations (e.g., corresponding to the outer boundaries) of the first and second planar surfaces PSRF1 and PSRF2 at least at locations proximate to the edge EDG (e.g., in various implementations, certain boundary locations of the edge EDG may also be determined). For each scan line SCL, one or more boundary point locations BPL maybe determined (e.g., which may have corresponding coordinates that are determined within an XYZ or other coordinate system). Based on such determinations, in one example the video tool and/or other metrology operations may include determining a dimension D1 between the first and second planar surfaces PSRF1 and PSRF2 (e.g., corresponding to a thickness or other dimension of workpiece WP). It will be appreciated that the accuracy of such determinations may be improved in accordance with utilization of techniques as disclosed herein (e.g., which provide/produce the image IMG-C for utilization in such processes, as opposed to images such as images IMG-A or IMG-B, which would generally result in less accurate determinations/measurements).

As shown in FIG. 14, in the display area included in the image, the box tool BXT with the scan lines SCL in a second orientation is utilized to determine the boundary locations (e.g., the outer boundary) of the edge EDG. For each scan line SCL, a boundary point location BPL may be determined (e.g., which may have corresponding coordinates that are determined within an XYZ or other coordinate system). In accordance with a determination of a number of such boundary point locations BPL, a profile of the edge EDG may be determined and/or certain characteristics of the edge EDG may be determined (e.g., in accordance with the relative coordinates of the boundary point locations BPL which may indicate certain relative dimensions/geometric properties of the edge, etc.) In various implementations, such characteristics of the edge/workpiece may also be utilized in combination with other similar determined characteristics from other images corresponding to other portions of the edge (e.g., for images acquired of other radial portions of the edge EDG as the workpiece WP is rotated by the rotation mechanism RM) for determining a 3 dimensional (3D) profile of the edge EDG (e.g., for verifying if the characteristics are within manufacturing tolerances and/or otherwise determining if any defects or other concerning aspects or features may be present, etc.).

It will be appreciated that configurations utilizing the principles as disclosed herein (e.g., which improve the accuracy of the representation of the edge EDG and the first and second planar surfaces PSRF1 and PSRF2 in the corresponding image, such as image IMG-C of FIG. 3C) correspondingly improve the accuracy of the corresponding measurements and/or profile determinations for the workpiece WP. Such may be contrasted with prior configurations that do not utilize such principles (e.g., which may produce images such as image IMG-A and/or image IMG-B of FIGS. 3A and 3B), for which certain correspondingly determined boundary point locations BPL (e.g., with correspondingly determined coordinates) may be relatively less accurate in relation to the physical characteristics/dimensions of the edge EDG, planar surfaces, etc. of the workpiece.

Figure 15:
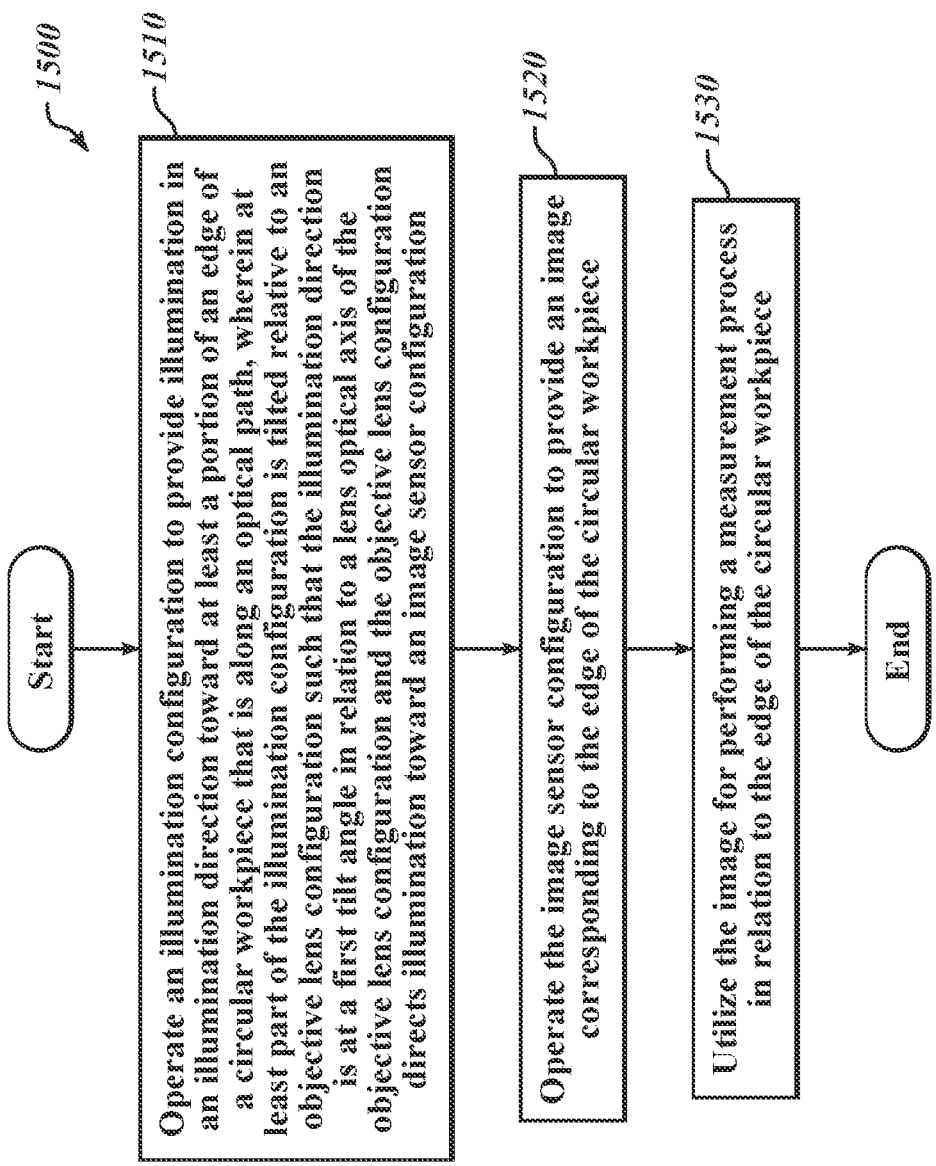
FIG. 15 is a flow diagram illustrating a method for operating a metrology system in accordance with principles as disclosed herein.

FIG. 15 is a flow diagram illustrating a method 1500 for operating a metrology system (e.g., for measuring an edge of a circular workpiece such as a semiconductor wafer) in accordance with principles as disclosed herein. At a block 1510, an illumination configuration is operated to provide illumination in an illumination direction toward at least a portion of an edge of a circular workpiece that is along an optical path, wherein at least part of the illumination configuration is tilted relative to an objective lens configuration such that the illumination direction is at a first tilt angle in relation to a lens optical axis of the objective lens configuration and the objective lens configuration directs illumination toward an image sensor configuration. At a block 1520, the image sensor configuration is operated to provide an image corresponding to the edge of the circular workpiece. At a block 1530, the image is utilized for performing a measurement process in relation to the edge of the workpiece.

In various implementations, the measurement process may include determining coordinates of a point (e.g., corresponding to a boundary point location BPL) on the edge (e.g., as described above with respect to FIGS. 13 and 14). As noted above, the measurement of the edge may have a higher accuracy due at least in part to the first tilt angle TA1 of the configuration, in comparison to a measurement that would result from a similar configuration without the first tilt angle TA1 and in which the illumination direction was correspondingly coaxial or parallel with the lens optical axis LOA.

The following describes various exemplary embodiments of the present disclosure with various features and elements annotated with reference signs found in FIGS. 1-15. It should be understood that the reference signs are added to indicate exemplary embodiments, and the features and elements are not limited to the particular embodiments illustrated in FIGS. 1-15.

In some embodiments, a metrology system 100 comprises an illumination configuration IC, an objective lens configuration OLC, and an image sensor configuration IMSC. The illumination configuration IC includes an illumination source IS. The objective lens configuration OLC includes an objective lens OL and has a lens optical axis LOA. The image sensor configuration IMSC includes an image sensor IMS. The illumination configuration IC, the objective lens configuration OLC and the image sensor configuration IMSC form an optical path OPATH along which illumination from the illumination configuration IC travels. The illumination configuration IC is configured to provide illumination in an illumination direction ID toward at least a portion of an edge EDG of a circular workpiece WP that is along the optical path OPATH. At least part of the illumination configuration IC is tilted relative to the objective lens configuration OLC such that the illumination direction ID is at a first tilt angle TA1 in relation to the lens optical axis LOA of the objective lens configuration OLC. The objective lens configuration OLC directs illumination toward the image sensor configuration IMSC which is configured to provide an image IMG-C corresponding to the edge EDG of the circular workpiece WP.

In some implementations, the circular workpiece WP comprises the edge EDG and first and second planar surfaces PSRF1 and PSRF2, for which a first tilt direction TD1 corresponding to the first tilt angle TA1 is nominally parallel to the first and second planar surfaces PSRF1 and PSRF2. In some implementations, the first tilt direction TD1 and the first tilt angle TA1 lie in a first tilt angle plane TAP1 that is parallel to the first and second planar surfaces PSRF1 and PSRF2. In some implementations, the illumination direction ID is nominally parallel to the first and second planar surfaces PSRF1 and PSRF2. In some implementations, at least part of the illumination configuration IC is configured to be adjusted to adjust the illumination direction ID to be nominally parallel to the first and second planar surfaces PSRF1 and PSRF2.

In some implementations, the first tilt angle TA1 is at least one degree. In some implementations, the first tilt angle TA1 is at least two degrees.

In some implementations, the system further comprises a rotation mechanism RM configured to rotate the circular workpiece WP.

In some implementations, the illumination configuration IC further comprises an illumination source aperture ISA-2 that is not circular.

In some implementations, the illumination source IS is not a white illumination source and provides only a single color of illumination.

In some implementations, the image sensor IMS is tilted relative to the objective lens configuration OLC such that a sensor direction SD is at a sensor tilt angle STA in relation to the lens optical axis LOA of the objective lens configuration OLC.

In some implementations, the objective lens configuration OLC further comprises an aperture component MAC with an aperture MAP that is asymmetric about the lens optical axis LOA and that is configured to block low angle scattered illumination.

In some embodiments, a method for operating the metrology system 100 is provided. In accordance with the method, the illumination configuration IC is operated to provide illumination in an illumination direction ID toward at least a portion of an edge EDG of a circular workpiece WP that is along an optical path OPATH, wherein at least part of the illumination configuration IC is tilted relative to the objective lens configuration OLC such that the illumination direction ID is at a first tilt angle TA1 in relation to the lens optical axis LOA of the objective lens configuration OLC and the objective lens configuration OLC directs illumination toward the image sensor configuration IMSC. The image sensor configuration IMSC is operated to provide an image IMG-C corresponding to the edge EDG of the circular workpiece WP.

In some implementations, the method further comprises utilizing the image for performing a measurement process for determining a measurement of the edge EDG. In some implementations, the measurement process comprises determining coordinates of a point on the edge EDG. In some implementations, the measurement of the edge EDG has a higher accuracy due at least in part to the first tilt angle TA1, in comparison to a measurement that would result from a similar configuration without the first tilt angle TA1 in which the illumination direction ID was correspondingly coaxial or parallel with the lens optical axis LOA.

In some implementations, the method further comprises adjusting at least part of the illumination configuration IC to adjust the illumination direction ID to be nominally parallel to first and second planar surfaces PSRF1 and PSRF2 of the circular workpiece WP.

According to one aspect, the illumination configuration IC is provided for use in a metrology system 100. The illumination configuration IC, the objective lens configuration OLC and the image sensor configuration IMSC form an optical path OPATH along which illumination from the illumination configuration IC travels. The illumination configuration IC is configured to provide illumination in an illumination direction ID toward at least a portion of an edge EDG of a circular workpiece WP that is along the optical path OPATH. At least part of the illumination configuration IC is tilted relative to the objective lens configuration OLC such that the illumination direction ID is at a first tilt angle TA1 in relation to the lens optical axis LOA of the objective lens configuration OLC. The objective lens configuration OLC directs illumination toward the image sensor configuration IMSC which is configured to provide an image IMG-C corresponding to the edge EDG of the circular workpiece WP.

In some implementations, the circular workpiece WP comprises the edge EDG and first and second planar surfaces PSRF1 and PSRF2, for which a first tilt direction TD1 corresponding to the first tilt angle TA1 is nominally parallel to the first and second planar surfaces PSRF1 and PSRF2. In some implementations, at least part of the illumination configuration IC is configured to be adjusted to adjust the illumination direction ID to be nominally parallel to the first and second planar surfaces PSRF1 and PSRF2.

As used herein, the term "nominally" encompasses variations of one or more parameters that fall within acceptable tolerances (e.g., less than a 1% or 1 degree difference from the stated relationship). As an example, in one implementation a reference to an illumination direction ID being, or being made to be, nominally parallel with one or more planar surfaces of a circular workpiece WP may indicate a corresponding second tilt angle TA2 of less than 1 degree, or less than 0.1 degree, such as in accordance with acceptable tolerances for the second tilt angle TA2 being approximately/nominally 0 degrees as corresponding to the approximately/nominally parallel relationship.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
   an illumination configuration comprising an illumination source;
   an objective lens configuration comprising an objective lens and having a lens optical axis; and
   an image sensor configuration comprising an image sensor;
   wherein:
      the illumination configuration, the objective lens configuration and the image sensor configuration form an optical path along which illumination from the illumination configuration travels;
      the illumination configuration is configured to provide illumination in an illumination direction toward at least a portion of an edge of a circular workpiece that is along the optical path;
      at least part of the illumination configuration is tilted relative to the objective lens configuration such that the illumination direction is at a first tilt angle in relation to the lens optical axis of the objective lens configuration;
      the circular workpiece comprises the edge and first and second planar surfaces, for which a first tilt direction corresponding to the first tilt angle is nominally parallel to the first and second planar surfaces; and
      the objective lens configuration directs illumination toward the image sensor configuration which is configured to provide an image corresponding to the edge of the circular workpiece.

2. The system of claim 1, wherein the first tilt direction and the first tilt angle lie in a first tilt angle plane that is parallel to the first and second planar surfaces.

3. The system of claim 1, wherein the illumination direction is nominally parallel to the first and second planar surfaces.

4. The system of claim 3, wherein at least part of the illumination configuration is configured to be adjusted to adjust the illumination direction to be nominally parallel to the first and second planar surfaces.

5. The system of claim 1, wherein the first tilt angle is at least one degree.

6. The system of claim 1, wherein the first tilt angle is at least two degrees.

7. The system of claim 1, further comprising a rotation mechanism configured to rotate the circular workpiece.

8. The system of claim 1, wherein the illumination configuration further comprises an illumination source aperture that is not circular.

9. The system of claim 1, wherein the illumination source is not a white illumination source and provides only a single color of illumination.

10. The system of claim 1, wherein the image sensor is tilted relative to the objective lens configuration such that a sensor direction is at a sensor tilt angle in relation to the lens optical axis of the objective lens configuration.

11. The system of claim 1, wherein the objective lens configuration further comprises an aperture component with an aperture that is asymmetric about the lens optical axis and that is configured to block low angle scattered illumination.

12. The system of claim 1, wherein the image corresponding to the edge of the circular workpiece is a shadow image which comprises a shadow of the edge of the circular workpiece.

13. A method for operating a metrology system,
   the metrology system comprising:
      an illumination configuration comprising an illumination source;
      an objective lens configuration comprising an objective lens and having a lens optical axis; and
      an image sensor configuration comprising an image sensor;
   the method comprising:
      operating the illumination configuration to provide illumination in an illumination direction toward at least a portion of an edge of a circular workpiece that is along an optical path, wherein:
         at least part of the illumination configuration is tilted relative to the objective lens configuration such that the illumination direction is at a first tilt angle in relation to the lens optical axis of the objective lens configuration;

the circular workpiece comprises the edge and first and second planar surfaces, for which a first tilt direction corresponding to the first tilt angle is nominally parallel to the first and second planar surfaces; and the objective lens configuration directs illumination toward the image sensor configuration; and operating the image sensor configuration to provide an image corresponding to the edge of the circular workpiece.

14. The method of claim 13, further comprising utilizing the image for performing a measurement process for determining a measurement of the edge.

15. The method of claim 14, wherein the measurement process comprises determining coordinates of a point on the edge.

16. The method of claim 14, wherein the measurement of the edge has a higher accuracy due at least in part to the first tilt angle, in comparison to a measurement that would result from a similar configuration without the first tilt angle in which the illumination direction was correspondingly coaxial or parallel with the lens optical axis.

17. The method of claim 13, further comprising adjusting at least part of the illumination configuration to adjust the illumination direction to be nominally parallel to first and second planar surfaces of the circular workpiece.

18. An illumination configuration for use in a metrology system, the metrology system comprising:
an objective lens configuration comprising an objective lens and having a lens optical axis; and
an image sensor configuration comprising an image sensor;
the illumination configuration comprising an illumination source;
wherein:
the illumination configuration, the objective lens configuration and the image sensor configuration form an optical path along which illumination from the illumination configuration travels;
the illumination configuration is configured to provide illumination in an illumination direction toward at least a portion of an edge of a circular workpiece that is along the optical path;
at least part of the illumination configuration is tilted relative to the objective lens configuration such that the illumination direction is at a first tilt angle in relation to the lens optical axis of the objective lens configuration;
the circular workpiece comprises the edge and first and second planar surfaces, for which a first tilt direction corresponding to the first tilt angle is nominally parallel to the first and second planar surfaces; and
the objective lens configuration directs illumination toward the image sensor configuration which is configured to provide an image corresponding to the edge of the circular workpiece.

19. The illumination configuration of claim 18, wherein at least part of the illumination configuration is configured to be adjusted to adjust the illumination direction to be nominally parallel to the first and second planar surfaces.

20. The illumination configuration of claim 18, wherein the image corresponding to the edge of the circular workpiece is a shadow image which comprises a shadow of the edge of the circular workpiece.

* * * * *